United States Patent
Wu et al.

(10) Patent No.: US 11,464,014 B2
(45) Date of Patent: Oct. 4, 2022

(54) TECHNIQUES FOR IMPROVED BEAM MANAGEMENT

(71) Applicant: QUALCOMM Incorporated, San Diego, CA (US)

(72) Inventors: Yongle Wu, San Diego, CA (US); Mihir Vijay Laghate, San Diego, CA (US); Farhad Meshkati, San Diego, CA (US); Raghu Narayan Challa, San Diego, CA (US); Jyothi Kiran Vattikonda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/178,864

(22) Filed: Feb. 18, 2021

(65) Prior Publication Data
US 2021/0400648 A1    Dec. 23, 2021

Related U.S. Application Data

(60) Provisional application No. 63/042,181, filed on Jun. 22, 2020.

(51) Int. Cl.
*H04W 88/06*  (2009.01)
*H04W 72/04*  (2009.01)
(Continued)

(52) U.S. Cl.
CPC ........ *H04W 72/046* (2013.01); *H04B 17/382* (2015.01); *H04W 48/20* (2013.01); *H04W 72/0413* (2013.01); *H04W 88/06* (2013.01)

(58) Field of Classification Search
CPC .............. H04W 72/046; H04W 48/20; H04W 72/0413; H04W 88/06; H04W 36/08;
(Continued)

(56) References Cited

U.S. PATENT DOCUMENTS

| | | | |
|---|---|---|---|
| 2010/0273499 A1* | 10/2010 | van Rensburg ... | H04W 72/1231 455/450 |
| 2014/0146863 A1* | 5/2014 | Seol ..................... | H04B 7/0456 375/224 |

(Continued)

FOREIGN PATENT DOCUMENTS

| WO | 2016018121 A1 | 2/2016 |
|---|---|---|
| WO | 2016085266 A1 | 6/2016 |
| WO | 2017202212 A1 | 11/2017 |

OTHER PUBLICATIONS

Partial International Search Report—PCT/US2021/034172—ISA/EPO—dated Sep. 6, 2021.
(Continued)

*Primary Examiner* — Kenneth T Lam
(74) *Attorney, Agent, or Firm* — Dalei Dong; Harrity & Harrity, LLP

(57) ABSTRACT

Various aspects of the present disclosure generally relate to wireless communication. In some aspects, a user equipment may measure a beam, according to a measurement configuration, to determine a channel condition value of the beam, modify the channel condition value based at least in part on at least one of one or more beam characterizations, a derivation of a beamforming gain value, or an estimation of the beamforming gain value, and transmit, to a base station, a measurement report indicating the modified channel condition value. Numerous other aspects are provided.

30 Claims, 9 Drawing Sheets

(51) Int. Cl.
*H04W 48/20* (2009.01)
*H04B 17/382* (2015.01)

(58) Field of Classification Search
CPC .............. H04W 24/10; H04W 36/0085; H04B 17/382; H04B 17/309; H04B 7/0617
See application file for complete search history.

(56) References Cited

U.S. PATENT DOCUMENTS

| | | | |
|---|---|---|---|
| 2016/0043792 A1* | 2/2016 | Jeong | H04B 7/0862 |
| | | | 370/328 |
| 2017/0215117 A1* | 7/2017 | Kwon | H04W 36/32 |
| 2019/0082346 A1* | 3/2019 | Tang | H04L 5/0048 |
| 2020/0367075 A1* | 11/2020 | Nagaraja | H04B 7/086 |
| 2022/0030442 A1* | 1/2022 | Laghate | H04W 24/10 |

OTHER PUBLICATIONS

International Search Report and Written Opinion—PCT/US2021/034172—ISA/EPO—dated Oct. 27, 2021.

\* cited by examiner

TECHNIQUES FOR IMPROVED BEAM MANAGEMENT

CROSS-REFERENCE TO RELATED APPLICATION

This patent application claims priority to U.S. Provisional Patent Application No. 63/042,181, filed on Jun. 22, 2020, entitled "TECHNIQUES FOR IMPROVED BEAM MANAGEMENT," and assigned to the assignee hereof. The disclosure of the prior Application is considered part of and is incorporated by reference into this patent Application.

FIELD OF THE DISCLOSURE

Aspects of the present disclosure generally relate to wireless communication and to techniques and apparatuses for improved beam management.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include measuring a beam, according to a measurement configuration, to determine a channel condition value of the beam; modifying the channel condition value based at least in part on at least one of one or more beam characterizations, a derivation of a beamforming gain value, or an estimation of the beamforming gain value; and transmitting, to a base station, a measurement report indicating the modified channel condition value. The method allows for improved network performance as the UE's report of a modified channel condition value may enable the base station to improve beam management based on the measurement report indicating the modified channel condition value.

In some aspects, the method may include determining a modification trigger event based at least in part on the measurement of the beam, wherein modifying the channel condition value is based at least in part on the determination of the modification trigger event.

In some aspects, the method may include establishing a communication connection using a first radio access technology (RAT), wherein measuring the beam, according to the measurement configuration, to determine the channel condition value of the beam includes measuring a beam of a second RAT (or of the first RAT), according to the measurement configuration received via the communication connection, to determine a channel condition value of the beam of the second RAT (or the first RAT). Thereby, the channel condition value may be determined (e.g., for a beam of a neighboring cell of the first RAT) while in communication with the first RAT and/or the channel condition value may be determined for a beam of a second RAT. As a result, beam management while measuring a beam of the first RAT and/or a second RAT is improved by triggering the measurement event for reporting measurement values of the first RAT and/or a second RAT to the base station of the first RAT.

In some aspects, the first RAT may be a Long Term Evolution (LTE) RAT and/or the second RAT may be a New Radio (NR) RAT.

In some aspects, the measurement configuration may be associated with an inter-RAT (IRAT) cell selection procedure, and the measurement configuration may indicate a measurement event for reporting measurement values for the IRAT cell selection procedure.

In some aspects, the measurement event may indicate a reporting threshold for reporting measurement values of an NR cell associated with the IRAT cell selection procedure.

In some aspects, measuring the beam, according to the measurement configuration, to determine the channel condition value of the beam may comprise measuring the beam (e.g., of the first RAT or the second RAT), according to the measurement configuration, using a wide beam to determine the channel condition value of the beam (e.g., of the first RAT or the second RAT).

In some aspects, the method may include determining a beamforming gain value associated with the measurement of the beam (e.g., of the second RAT), wherein the beamforming gain value is based at least in part on at least one of: an antenna module associated with a wide beam used to determine the channel condition value of the beam (e.g., of the second RAT), the wide beam used to determine the channel condition value of the beam (e.g., of the second RAT), or an available beam level of the antenna module associated with the wide beam used to determine the channel condition value of the beam (e.g., of the second RAT). In some aspects, determining the beamforming gain value may be based at least in part on the one or more beam characterizations, the derivation of the beamforming gain value, or the estimation of the beamforming gain value.

In some aspects, the method may include determining a modification trigger event based on at least one of: a difference between the channel condition value of the beam of the RAT (e.g. of the second RAT) and a reporting threshold for reporting channel condition values of the RAT (e.g., of the second RAT) satisfies a threshold, or the channel condition value of the beam of the RAT (e.g., of the second RAT) satisfies a cell edge threshold.

In some aspects, modifying the channel condition value may comprise modifying the channel condition value of the beam (e.g., of the second RAT) by a beamforming gain value.

In some aspects, modifying the channel condition value of the beam (e.g., of the second RAT) by the beamforming gain value may comprise determining a beam level, of one or more beam levels associated with an antenna module of the UE, with all beams included in the beam level available, and modifying the channel condition value of the beam (e.g., of the second RAT) by a beamforming gain value associated with the beam level with all beams included in the beam level available. In some aspects, determining the beam level with all beams included in the beam level available may comprise determining whether each beam included in the beam level is available, where an availability of a beam included in the beam level is based at least in part on an operating condition of the UE.

In some aspects, transmitting, to the base station, the measurement report indicating the modified channel condition value may comprise determining that a modified channel condition value of the beam of the RAT (e.g., of the second RAT) satisfies a reporting threshold for reporting channel condition values of the RAT (e.g., of the second RAT), and transmitting, to the base station, the measurement report indicating the modified channel condition value of the beam of the RAT (e.g., of the second RAT) based at least in part on the determination that the modified channel condition value of the beam of the RAT (e.g., of the second RAT) satisfies the reporting threshold for reporting channel condition values of the RAT (e.g., of the second RAT).

In some aspects, the measurement configuration may be associated with a Layer 1 (L1) reference signal receive power (L1-RSRP) measurement report.

In some aspects, measuring the beam, according to the measurement configuration, to determine the channel condition value of the beam may comprise measuring one or more synchronization signal blocks (SSBs) to determine RSRP values of the one or more SSBs, and determining that an RSRP value of a serving SSB, of the one or more SSBs, is not a highest RSRP value based at least in part on the measurement of the one or more SSBs.

In some aspects, the method may include determining a modification trigger event based at least in part on the measurement of the beam. In some aspects, determining the modification trigger event may comprise determining that an RSRP value of an SSB is a highest RSRP value, and determining that a difference between the RSRP value of the SSB and the RSRP value of a serving SSB satisfies an RSRP threshold. In some aspects, determining the modification trigger event may comprise determining an amount of time since a last SSB switch, and determining that the amount of time since the last SSB switch satisfies a time threshold. In some aspects, determining the modification trigger event may comprise determining that at least one of: an RSRP value of a serving SSB satisfies a serving RSRP threshold, or a signal-to-noise ratio (SNR) of the serving SSB satisfies a serving SNR threshold.

In some aspects, modifying the channel condition value may comprise modifying an RSRP value of a serving SSB by an RSRP modification value, the RSRP modification value is based at least in part on a value associated with an RSRP threshold.

In some aspects, transmitting, to the base station, the measurement report indicating the modified channel condition value may comprise transmitting, to the base station, an L1-RSRP measurement report indicating a modified RSRP value of a serving SSB.

In some aspects, a UE for wireless communication may include a memory and one or more processors coupled to the memory. The memory and the one or more processors may be configured to measure a beam, according to a measurement configuration, to determine a channel condition value of the beam; modify the channel condition value based at least in part on at least one of one or more beam characterizations, a derivation of a beamforming gain value, or an estimation of the beamforming gain value; and transmit, to a base station, a measurement report indicating the modified channel condition value.

In some aspects, the one or more processors may be further configured to determine a modification trigger event based at least in part on the measurement of the beam, wherein modifying the channel condition value is based at least in part on the determination of the modification trigger event.

In some aspects, the one or more processors may be further configured to establish a communication connection using a first RAT, wherein the one or more processors, when measuring the beam, according to the measurement configuration, to determine the channel condition value of the beam, may measure a beam of a second RAT, according to the measurement configuration received via the communication connection, to determine a channel condition value of the beam of the second RAT.

In some aspects, the one or more processors, when measuring the beam, according to the measurement configuration, to determine the channel condition value of the beam, may measure the beam (e.g., of the second RAT), according to the measurement configuration, using a wide beam to determine the channel condition value of the beam (e.g., of the second RAT).

In some aspects, the one or more processors may be further configured to determine a beamforming gain value associated with the measurement of the beam (e.g., of the second RAT), wherein the beamforming gain value is based at least in part on at least one of: an antenna module associated with a wide beam used to determine the channel condition value of the beam (e.g., of the second RAT), the wide beam used to determine the channel condition value of the beam (e.g., of the second RAT), or an available beam level of the antenna module associated with the wide beam used to determine the channel condition value of the beam (e.g., of the second RAT). In some aspects, determining the beamforming gain value is based at least in part on: one or more beam characterizations, a derivation of the beamforming gain value, or an estimation of the beamforming gain value.

In some aspects, the one or more processers may be further configured to determine a modification trigger event based on at least one of: a difference between the channel condition value of the beam of a RAT (e.g., of the second RAT) and a reporting threshold for reporting channel condition values of the RAT (e.g., of the second RAT) satisfies a threshold, or the channel condition value of the beam of the RAT (e.g., of the second RAT) satisfies a cell edge threshold.

In some aspects, the one or more processors, when modifying the channel condition value, may modify the channel condition value of the beam (e.g., of the second RAT) by a beamforming gain value.

In some aspects, the one or more processors, when modifying the channel condition value of the beam (e.g., of the second RAT) by the beamforming gain value, may determine a beam level, of one or more beam levels associated with an antenna module of the UE, with all beams included in the beam level available, and modify the channel condition value of the beam (e.g., of the second RAT) by a beamforming gain value associated with the beam level with all beams included in the beam level available.

In some aspects, the one or more processors, when determining the beam level with all beams included in the beam level available, may determine whether each beam included in the beam level is available, wherein an availability of a beam included in the beam level is based at least in part on an operating condition of the UE.

In some aspects, the one or more processors, when transmitting, to the base station, the measurement report indicating the modified channel condition value, may determine that a modified channel condition value of the beam of the RAT (e.g., of the second RAT) satisfies a reporting threshold for reporting channel condition values of the RAT (e.g., of the second RAT), and transmit, to the base station, the measurement report indicating the modified channel condition value of the beam of the RAT (e.g., of the second RAT) based at least in part on the determination that the modified channel condition value of the beam of the RAT (e.g., of the second RAT) satisfies the reporting threshold for reporting channel condition values of the RAT (e.g., of the second RAT).

In some aspects, the one or more processors, when measuring the beam, according to the measurement configuration, to determine the channel condition value of the beam, may measure one or more SSBs to determine RSRP values of the one or more SSBs, and determine that an RSRP value of a serving SSB, of the one or more SSBs, is not a highest RSRP value based at least in part on the measurement of the one or more SSBs.

In some aspects, the one or more processors may be further configured to determine a modification trigger event based at least in part on the measurement of the beam. In some aspects, the one or more processors, when determining the modification trigger event, may determine that an RSRP value of an SSB is a highest RSRP value, and determine that a difference between the RSRP value of the SSB and the RSRP value of a serving SSB satisfies an RSRP threshold. In some aspects, the one or more processors, when determining the modification trigger event, may determine an amount of time since a last SSB switch, and determine that the amount of time since the last SSB switch satisfies a time threshold. In some aspects, the one or more processors, when determining the modification trigger event, may determine that at least one of: an RSRP value of a serving SSB satisfies a serving RSRP threshold, or an SNR of the serving SSB satisfies a serving SNR threshold.

In some aspects, the one or more processors, when modifying the channel condition value, may modify an RSRP value of a serving SSB by an RSRP modification value, wherein the RSRP modification value is based at least in part on a value associated with an RSRP threshold.

In some aspects, the one or more processors, when transmitting, to the base station, the measurement report indicating the modified channel condition value, may transmit, to the base station, an L1-RSRP measurement report indicating a modified RSRP value of a serving SSB.

In some aspects, a non-transitory computer-readable medium may store one or more instructions for wireless communication. The one or more instructions, when executed by one or more processors of a UE, may cause the one or more processors to measure a beam, according to a measurement configuration, to determine a channel condition value of the beam; modify the channel condition value based at least in part on at least one of one or more beam characterizations, a derivation of a beamforming gain value, or an estimation of the beamforming gain value; and transmit, to a base station, a measurement report indicating the modified channel condition value.

In some aspects, the one or more instructions, when executed by the one or more processors, may further cause the UE to determine a modification trigger event based at least in part on the measurement of the beam, wherein modifying the channel condition value is based at least in part on the determination of the modification trigger event.

In some aspects, the one or more instructions, when executed by the one or more processors, may further cause the UE to establish a communication connection using a first RAT, wherein the one or more instructions, that when executed by one or more processors cause the UE to measure the beam, according to the measurement configuration, to determine the channel condition value of the beam, may further cause the UE to measure a beam (e.g., of a second RAT), according to the measurement configuration received via the communication connection, to determine a channel condition value of the beam (e.g., of the second RAT).

In some aspects, the one or more instructions, that when executed by one or more processors cause the UE to measure the beam, according to the measurement configuration, to determine the channel condition value of the beam, may further cause the UE to measure the beam (e.g., of the second RAT), according to the measurement configuration, using a wide beam to determine the channel condition value of the beam (e.g., of the second RAT).

In some aspects, the one or more instructions, when executed by the one or more processors, may further cause the UE to determine a beamforming gain value associated with the measurement of the beam (e.g., of the second RAT), wherein the beamforming gain value is based at least in part on at least one of: an antenna module associated with a wide beam used to determine the channel condition value of the beam (e.g., of the second RAT), the wide beam used to determine the channel condition value of the beam (e.g., of the second RAT), or an available beam level of the antenna module associated with the wide beam used to determine the channel condition value of the beam (e.g., of the second RAT). In some aspects, determining the beamforming gain value is based at least in part on: one or more beam characterizations, a derivation of the beamforming gain value, or an estimation of the beamforming gain value.

In some aspects, the one or more instructions, when executed by the one or more processors, may further cause the UE to determine a modification trigger event based on at least one of: a difference between the channel condition value of the beam of the RAT (e.g., of the second RAT) and a reporting threshold for reporting channel condition values of the RAT (e.g., of the second RAT) satisfies a threshold, or the channel condition value of the beam of the RAT (e.g., of the second RAT) satisfies a cell edge threshold.

In some aspects, the one or more instructions, that when executed by one or more processors cause the UE to modify the channel condition value, may further cause the UE to modify the channel condition value of the beam (e.g., of the second RAT) by a beamforming gain value.

In some aspects, the one or more instructions, that when executed by one or more processors cause the UE to modify the channel condition value of the beam (e.g., of the second RAT) by the beamforming gain value, may further cause the UE to determine a beam level, of one or more beam levels associated with an antenna module of the UE, with all beams included in the beam level available; and modify the channel condition value of the beam (e.g., of the second RAT) by a beamforming gain value associated with the beam level with all beams included in the beam level available. In some aspects, the one or more instructions, that when executed by one or more processors cause the UE to determine the beam level with all beams included in the beam level available, may further cause the UE to determine whether each beam included in the beam level is available, wherein an availability of a beam included in the beam level is based at least in part on an operating condition of the UE.

In some aspects, the one or more instructions, that when executed by one or more processors cause the UE to transmit, to the base station, the measurement report indicating the modified channel condition value, may further cause the UE to determine that a modified channel condition value of the beam (e.g., of the second RAT) satisfies a reporting threshold for reporting channel condition values (e.g., of the second RAT); and transmit, to the base station, the measurement report indicating the modified channel condition value of the beam (e.g., of the second RAT) based at least in part on the determination that the modified channel condition value of the beam of the RAT (e.g., of the second RAT) satisfies the reporting threshold for reporting channel condition values of the RAT (e.g., of the second RAT).

In some aspects, the one or more instructions, that when executed by one or more processors cause the UE to measure the beam, according to the measurement configuration, to determine the channel condition value of the beam, may further cause the UE to measure one or more SSBs to determine RSRP values of the one or more SSBs; and determine that an RSRP value of a serving SSB, of the one or more SSBs, is not a highest RSRP value based at least in part on the measurement of the one or more SSBs.

In some aspects, the one or more instructions, when executed by the one or more processors, may further cause the UE to determine a modification trigger event based at least in part on the measurement of the beam. In some aspects, the one or more instructions, that when executed by one or more processors cause the UE to determine the modification trigger event, may further cause the UE to determine that an RSRP value of an SSB is a highest RSRP value; and determine that a difference between the RSRP value of the SSB and the RSRP value of a serving SSB satisfies an RSRP threshold. In some aspects, the one or more instructions, that when executed by one or more processors cause the UE to determine the modification trigger event, may further cause the UE to determine an amount of time since a last SSB switch; and determine that the amount of time since the last SSB switch satisfies a time threshold. In some aspects, the one or more instructions, that when executed by one or more processors cause the UE to determine the modification trigger event, may further cause the UE to determine that at least one of an RSRP value of a serving SSB satisfies a serving RSRP threshold, or an SNR of the serving SSB satisfies a serving SNR threshold.

In some aspects, the one or more instructions, that when executed by one or more processors cause the UE to modify the channel condition value, may further cause the UE to modify an RSRP value of a serving SSB by an RSRP modification value, wherein the RSRP modification value is based at least in part on a value associated with an RSRP threshold.

In some aspects, the one or more instructions, that when executed by one or more processors cause the UE to transmit, to the base station, the measurement report indicating the modified channel condition value, may further cause the UE to transmit, to the base station, an L1-RSRP measurement report indicating a modified RSRP value of a serving SSB.

In some aspects, an apparatus for wireless communication may include means for measuring a beam, according to a measurement configuration, to determine a channel condition value of the beam; means for modifying the channel condition value based at least in part on at least one of one or more beam characterizations, a derivation of a beamforming gain value, or an estimation of the beamforming gain value; and means for transmitting, to a base station, a measurement report indicating the modified channel condition value.

In some aspects, the apparatus may further comprise means for determining a modification trigger event based at least in part on the measurement of the beam, wherein modifying the channel condition value is based at least in part on the determination of the modification trigger event.

In some aspects, the apparatus may further comprise means for establishing a communication connection using a first RAT, wherein the means for measuring the beam, according to the measurement configuration, to determine the channel condition value of the beam may include means for measuring a beam (e.g., of a second RAT), according to the measurement configuration received via the communication connection, to determine a channel condition value of the beam of the first RAT or of the second RAT.

In some aspects, the means for measuring the beam, according to the measurement configuration, to determine the channel condition value of the beam may comprise means for measuring the beam (e.g., of the second RAT), according to the measurement configuration, using a wide beam to determine the channel condition value of the beam (e.g., of the second RAT).

In some aspects, the apparatus may further comprise means for determining a beamforming gain value associated with the measurement of the beam (e.g., of the second RAT), wherein the beamforming gain value is based at least in part on at least one of: an antenna module associated with a wide beam used to determine the channel condition value of the beam (e.g., of the second RAT), the wide beam used to determine the channel condition value of the beam (e.g., of the second RAT), or an available beam level of the antenna module associated with the wide beam used to determine the channel condition value of the beam (e.g., of the second RAT). In some aspects, determining the beamforming gain value is based at least in part on: the one or more beam characterizations, the derivation of the beamforming gain value, or the estimation of the beamforming gain value.

In some aspects, the apparatus may further comprise means for determining a modification trigger event based on at least one of: a difference between the channel condition value of the beam of the RAT (e.g., of the second RAT) and a reporting threshold for reporting channel condition values of the RAT (e.g., of the second RAT) satisfies a threshold, or the channel condition value of the beam of the RAT (e.g., of the second RAT) satisfies a cell edge threshold.

In some aspects, the means for modifying the channel condition value may comprise means for modifying the channel condition value of the beam (e.g., of the second RAT) by a beamforming gain value.

In some aspects, the means for modifying the channel condition value of the beam (e.g., of the second RAT) by the beamforming gain value may comprise means for determining a beam level, of one or more beam levels associated with an antenna module of the apparatus, with all beams included in the beam level available; and means for modifying the channel condition value of the beam (e.g., of the second RAT) by a beamforming gain value associated with the beam level with all beams included in the beam level available. In some aspects, the means for determining the beam level with all beams included in the beam level available may comprise means for determining whether each beam included in the beam level is available, wherein an availability of a beam included in the beam level is based at least in part on an operating condition of the apparatus.

In some aspects, the means for transmitting, to the base station, the measurement report indicating the modified channel condition value may comprise means for determining that a modified channel condition value of the beam of the RAT (e.g., of the second RAT) satisfies a reporting threshold for reporting channel condition values of the RAT (e.g., of the second RAT); and means for transmitting, to the base station, the measurement report indicating the modified channel condition value of the beam of the RAT (e.g., of the second RAT) based at least in part on the determination that the modified channel condition value of the beam of the RAT (e.g., of the second RAT) satisfies the reporting threshold for reporting channel condition values of the RAT (e.g., of the second RAT).

In some aspects, the means for measuring the beam, according to the measurement configuration, to determine the channel condition value of the beam may comprise means for measuring one or more SSBs to determine RSRP values of the one or more SSBs; and means for determining that an RSRP value of a serving SSB, of the one or more SSBs, is not a highest RSRP value based at least in part on the measurement of the one or more SSBs.

In some aspects, the apparatus may further comprise means for determining a modification trigger event based at least in part on the measurement of the beam. In some aspects, the means for determining the modification trigger event may comprise means for determining that an RSRP value of an SSB is a highest RSRP value; and means for determining that a difference between the RSRP value of the SSB and the RSRP value of a serving SSB satisfies an RSRP threshold. In some aspects, the means for determining the modification trigger event may comprise means for determining an amount of time since a last SSB switch; and means for determining that the amount of time since the last SSB switch satisfies a time threshold. In some aspects, the means for determining the modification trigger event may comprise means for determining that at least one of an RSRP value of a serving SSB satisfies a serving RSRP threshold, or an SNR of the serving SSB satisfies a serving SNR threshold.

In some aspects, the means for modifying the channel condition value may comprise means for modifying an RSRP value of a serving SSB by an RSRP modification value, wherein the RSRP modification value is based at least in part on a value associated with an RSRP threshold.

In some aspects, the means for transmitting, to the base station, the measurement report indicating the modified channel condition value may comprise means for transmitting, to the base station, an L1-RSRP measurement report indicating a modified RSRP value of a serving SSB.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
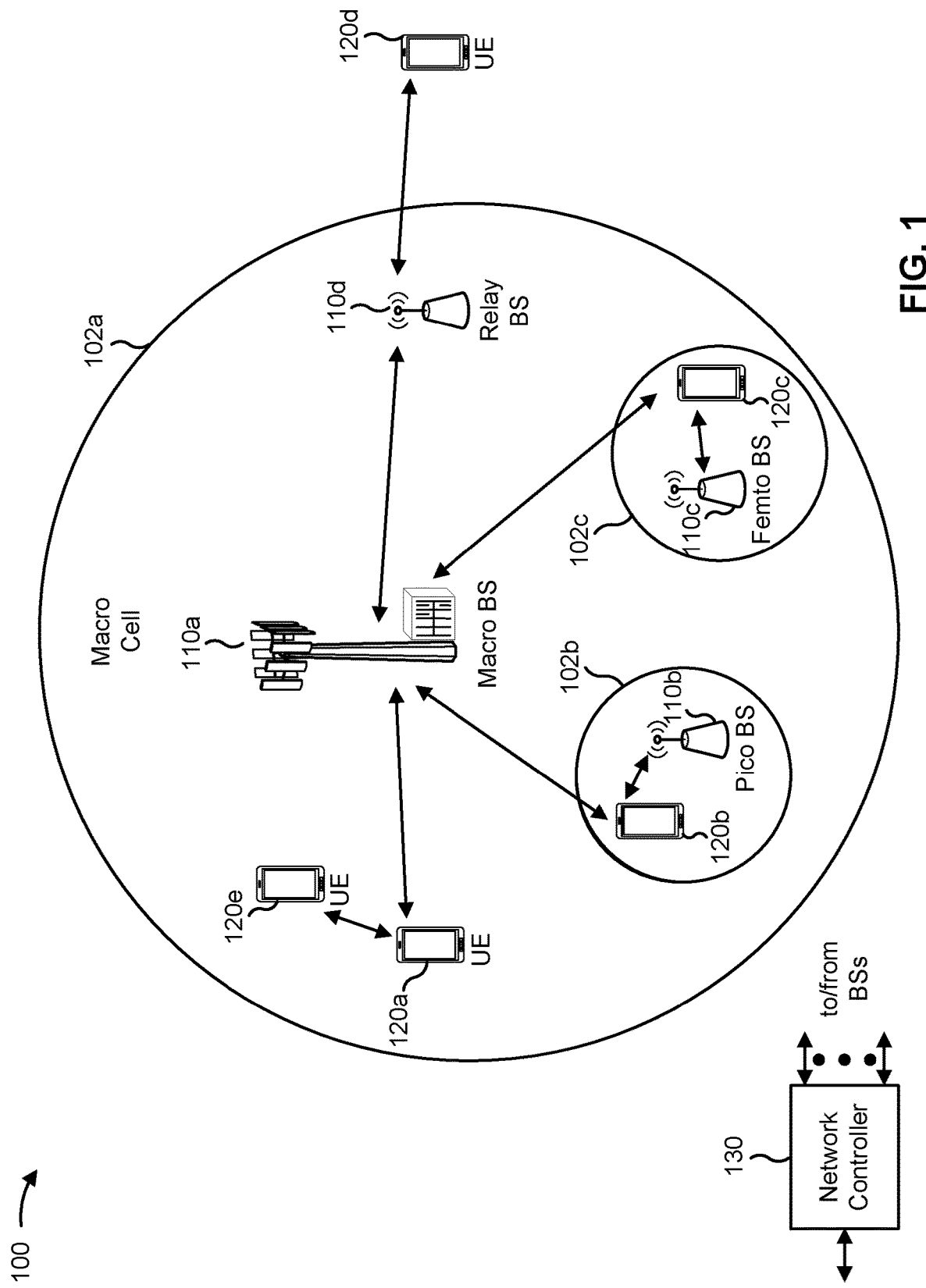
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, an e NodeB (eNB), a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
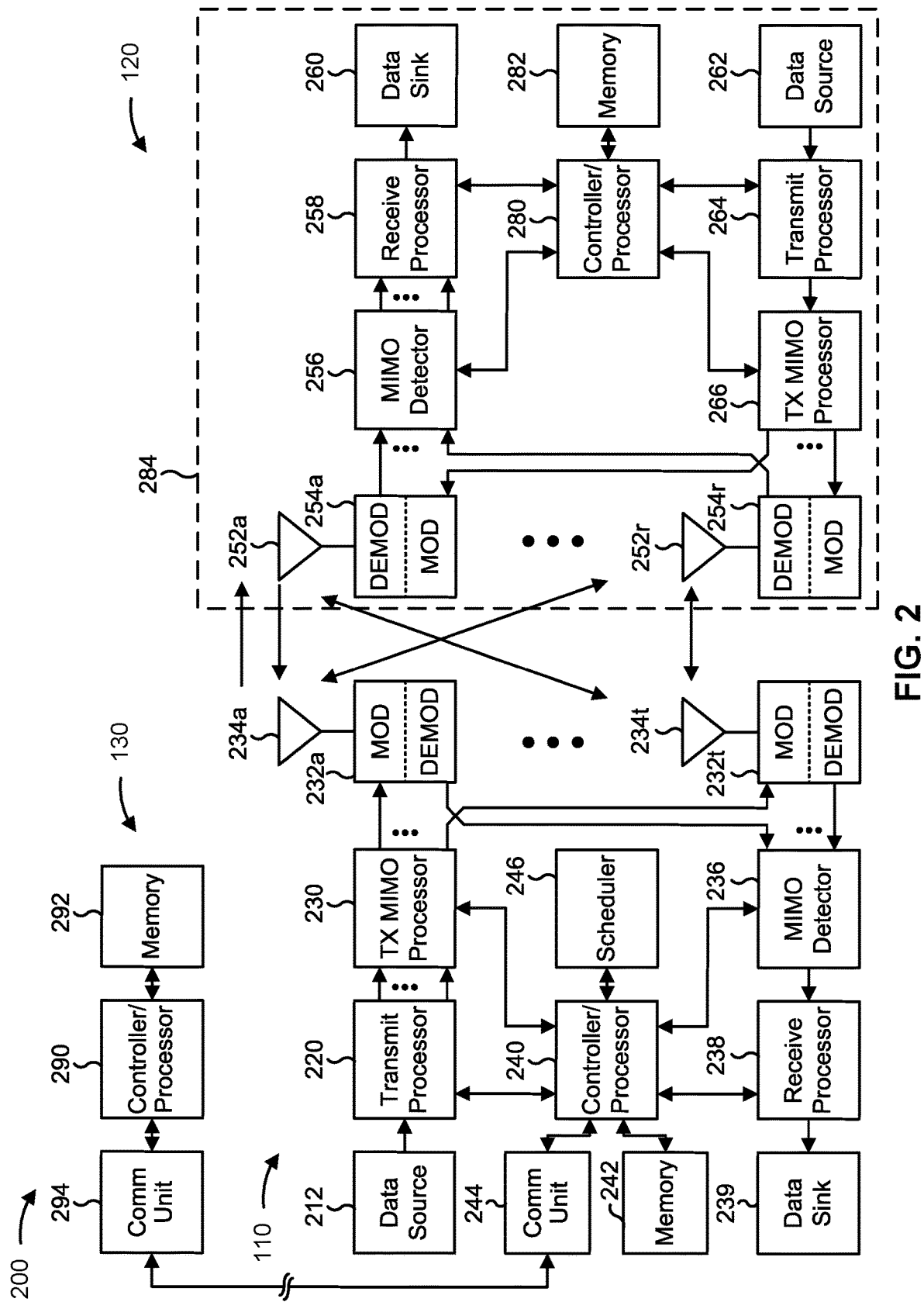
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with improved beam management, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, and/or interpreting the instructions.

In some aspects, UE 120 may include means for measuring a beam, according to a measurement configuration, to determine a channel condition value of the beam, means for modifying the channel condition value based at least in part on at least one of one or more beam characterizations, a derivation of a beamforming gain value, or an estimation of the beamforming gain value, means for transmitting, to a base station, a measurement report indicating the modified channel condition value, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
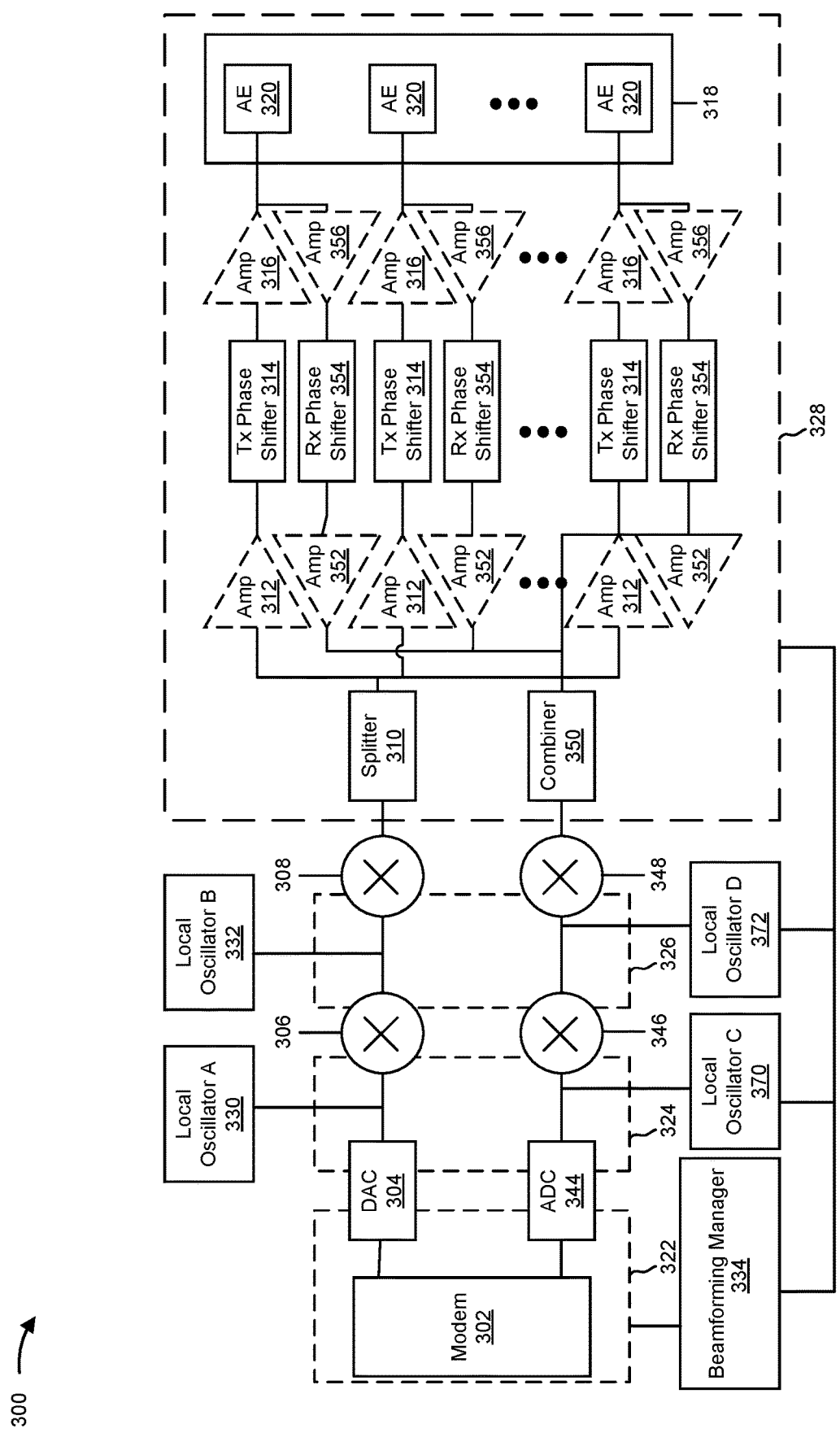
FIG. 3 is a diagram illustrating an example beamforming architecture that supports beamforming for millimeter wave communications, in accordance with the present disclosure.

FIG. 3 is a diagram illustrating an example beamforming architecture 300 that supports beamforming for millimeter wave communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a beamforming manager 334.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the beamforming manager 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element 320. Each of the amplifiers 312, 316 may be controlled independently (e.g., by the modem 302 or the beamforming manager 334) to provide independent control of the gain for each antenna element 320. For example, the modem 302 and/or the beamforming manager 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the beamforming manager 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays

318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the beamforming manager 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to digital signals. The digital signals output from ADC 344 are input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the beamforming manager 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The beamforming manager 334 may be located partially or fully within one or more other components of the architecture 300. For example, the beamforming manager 334 may be located within the modem 302 in some aspects.

As indicated above, FIG. 3 is provided as an example. Other examples may differ from what is described with regard to FIG. 3.

Figure 4:
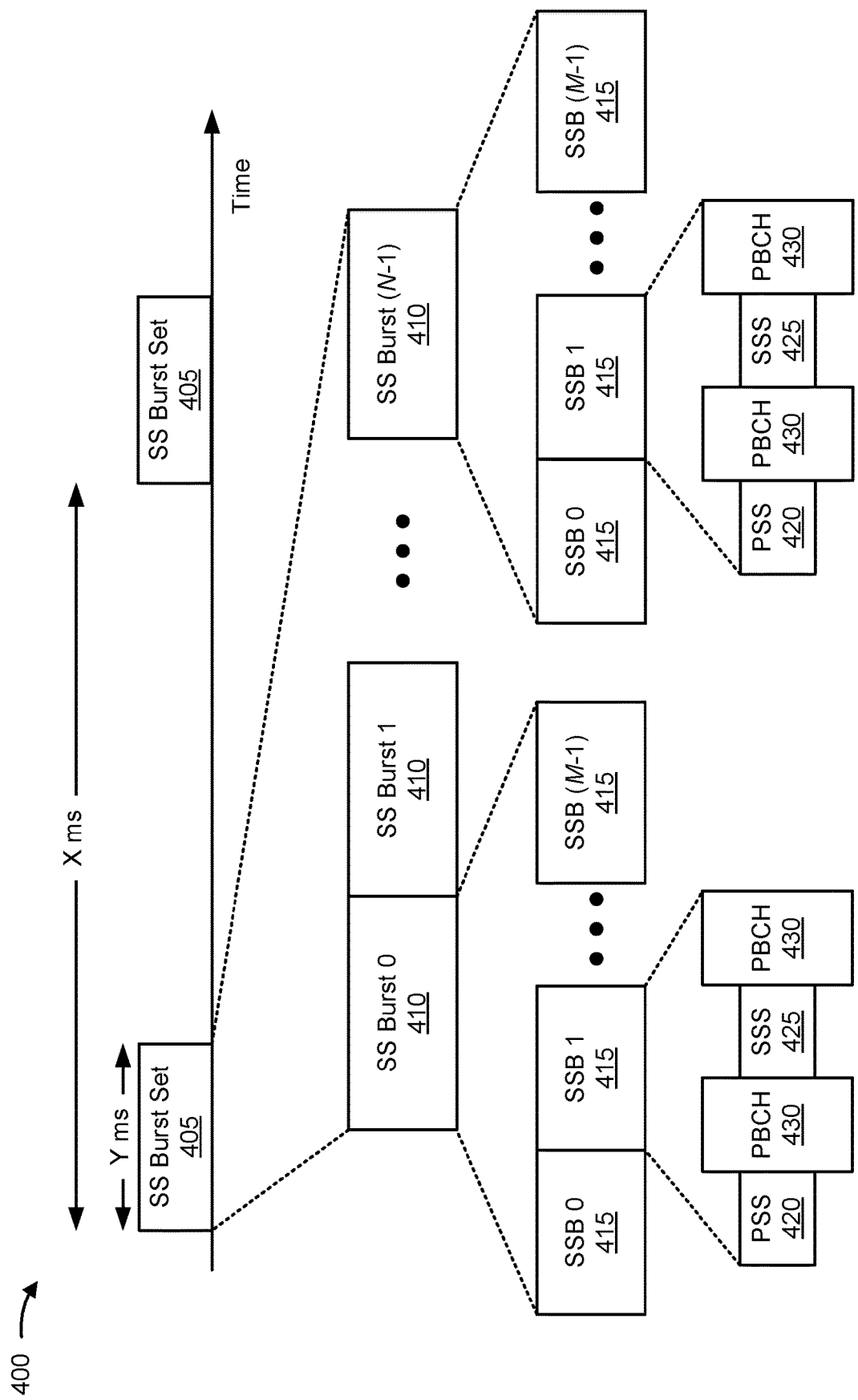
FIG. 4 is a diagram illustrating an example of a synchronization signal hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for beam management, beam selection, and/or the like (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window, an SSB measurement time configuration (SMTC) window, and/or the like.

In some aspects, an SSB 415 may include resources that carry a primary synchronization signal (PSS) 420, a secondary synchronization signal (SSS) 425, a physical broadcast channel (PBCH) 430, and/or the like. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure. Based at least in part on the monitoring and/or measuring, the UE 120 may indicate one or more SSBs 415 with a best signal parameter (e.g., a reference signal received power (RSRP) parameter and/or the like) to a base station 110. The base station 110 and the UE 120 may use the one or more indicated SSBs 415 to select one or more beams to be used for communication between the base station 110 and the UE 120 (e.g., for a random access channel (RACH) procedure and/or the like). Additionally, or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4.

Figure 5:
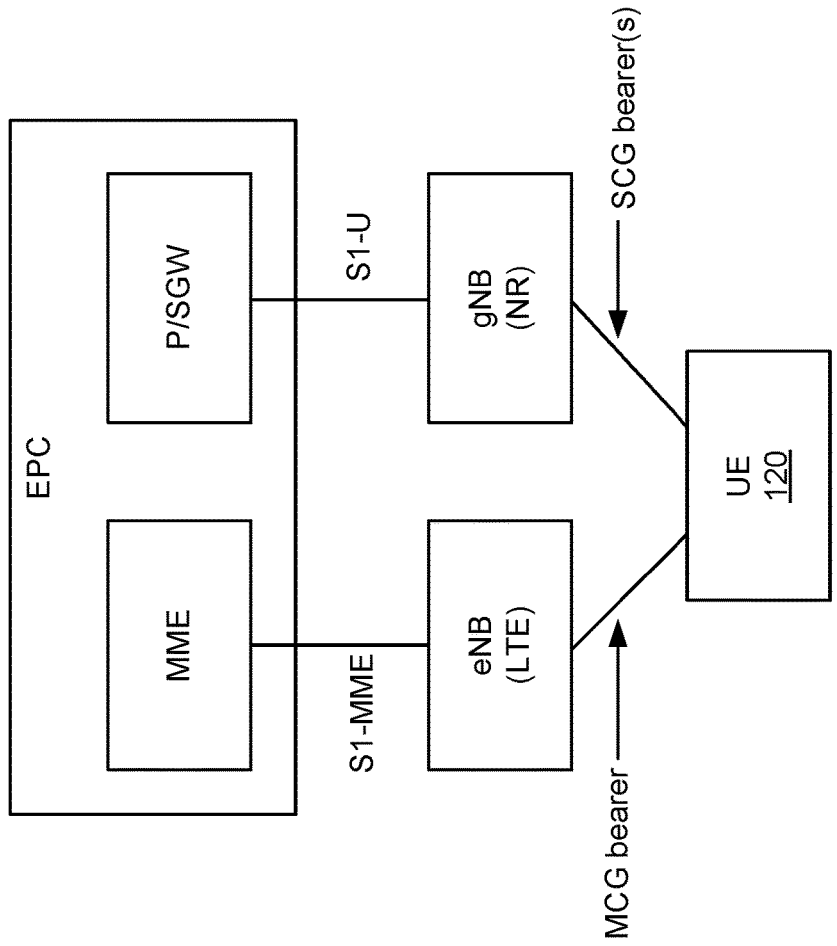
FIG. 5 is a diagram illustrating an example NR non-standalone architecture, in accordance with the present disclosure.

FIG. 5 is a diagram illustrating an example 500 of NR non-standalone (NSA) architecture, in accordance with the present disclosure.

As shown in FIG. 5, in an NR or 5G NSA mode, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 5, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 5, in some aspects, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, the UE 120 may communicate with the eNB via the MCG and may communicate with the gNB via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another.

In some aspects, the 5G NSA mode may be an Evolved Universal Mobile Telecommunications System Terrestrial Radio Access (E-UTRA)-NR dual connectivity (ENDC) mode or an NR-E-UTRA dual connectivity (NEDC) mode. In some aspects, a UE 120 operating in the ENDC mode or the NEDC mode may have dual connectivity with an LTE base station 110 (e.g., an eNB) and an NR base station 110 (e.g., a gNB).

As indicated above, FIG. 5 is provided as an example. Other examples may differ from what is described with respect to FIG. 5.

In some wireless networks, a base station may configure a UE to measure and report channel condition values of different beams so that the base station may perform one or more beam management procedures. For example, a UE may measure beams of a serving cell and may report the measurements to the base station according to a measurement configuration. Similarly, the UE may measure beams of one or more neighbor cells (e.g., of the same RAT or of a different RAT) and may report the measurements to the base station according to a measurement configuration. The base station 110 may receive the reported measurements from the UE and perform one or more beam management procedures. For example, the base station 110 may select a cell of a different RAT to add as an SCG (e.g., in a dual connectivity NSA mode), may determine a best beam pair for communicating with the UE (e.g., a best base station transmit beam and/or a best UE receive beam), may select a target cell for a handover procedure, and/or the like.

However, some measurement configurations may result in poor beam management. For example, a UE connected to a cell of a first RAT may be configured with a measurement configuration for an inter-RAT (IRAT) cell selection procedure. The IRAT cell selection procedure may configure a measurement event (e.g., a B1 measurement event) for reporting measurement values of a second RAT to the base station of the first RAT. In some aspects, the UE may detect and measure beams of the second RAT using a wide beam (e.g., a beam that has not been refined and/or a beam that is associated with a small beamforming gain). The UE may determine a channel condition value of a beam of the second RAT (e.g., using the wide beam) to determine whether the channel condition value of the beam of the second RAT satisfies or triggers the measurement event for reporting measurement values of a second RAT to the base station of the first RAT. However, a wide beam may not provide sufficient beamforming gain to the channel condition value of the beam of the second RAT to satisfy or trigger the measurement event for reporting measurement values of a second RAT to the base station of the first RAT. For example, a UE with poor antenna coverage and/or a UE that is a customer premises equipment (CPE), among other examples, may not materialize sufficient beamforming gain using a wide beam when measuring the beam of the second RAT to satisfy or trigger the measurement event for reporting measurement values of a second RAT to the base station of the first RAT. For example, near a cell edge of a cell of the second RAT, the UE may determine, using the wide beam, a poor (or lower) channel condition value of the beam of the second RAT than if the beam of the second RAT were measured by the UE using a narrow beam. As a result, the UE may not report the channel condition value of the beam of the second RAT to the base station of the first RAT.

Therefore, the base station of the first RAT may not add the cell of the second RAT as an SCG, even where a measurement of the beam of the second RAT by the UE using a more refined or narrow beam would have resulted in a channel condition value that would have satisfied or triggered the measurement event for reporting measurement values of a second RAT to the base station of the first RAT. Thus, the IRAT measurement configuration may result in poor beam management, as not adding the cell of the second RAT as an SCG (e.g., due to the channel condition value of the beam of the second RAT not being reported as the value determined by the UE using the wide beam) may degrade network performance (e.g., may decrease throughput compared to if the cell of the second RAT were added as an SCG and/or the like).

Further, a UE may be configured with a Layer 1 (L1) reference signal receive power (L1-RSRP) measurement configuration. The L1-RSRP measurement configuration may configure the UE to measure RSRP values of one or more SSBs transmitted by the base station. The base station 110 may receive the report indicating the RSRP values of the one or more SSBs and select an SSB associated with the highest RSRP value to be a serving SSB. However, in certain situations, two or more SSBs may have similar RSRP values. The RSRP values of two or more SSBs may fluctuate (e.g., due to fading, measurement errors, and/or the like) such that the SSB with the best RSRP value between the two or more SSBs changes frequently. As a result, the base station 110 may frequently trigger an SSB switch (e.g., switch the serving SSB from one SSB to another SSB). The frequent SSB switches may result in poor network performance due to the frequent switching between beams. Additionally, the frequent SSB switches may increase a signaling overhead associated with the UE reporting the new best SSB and the base station 110 signaling the SSB switch to the UE.

Some techniques and apparatuses described herein enable improved beam management. For example, a UE may be enabled to measure a beam, according to a measurement configuration, to determine a channel condition value of the beam. The UE may modify the channel condition value and transmit a measurement report, to a base station, indicating the modified channel condition value. As a result, the base station may be enabled to perform improved beam management based on the measurement report indicating the modified channel condition value. The improved beam management results in improved network performance (e.g. due to an increased throughput achieved through the beam management, due to a decrease in beam switches, and/or the like). Additionally, the improved beam management reduces a signaling overhead that would have otherwise been present when transmitting a measurement report indicating the original (e.g., not modified) channel condition value.

Figure 6:
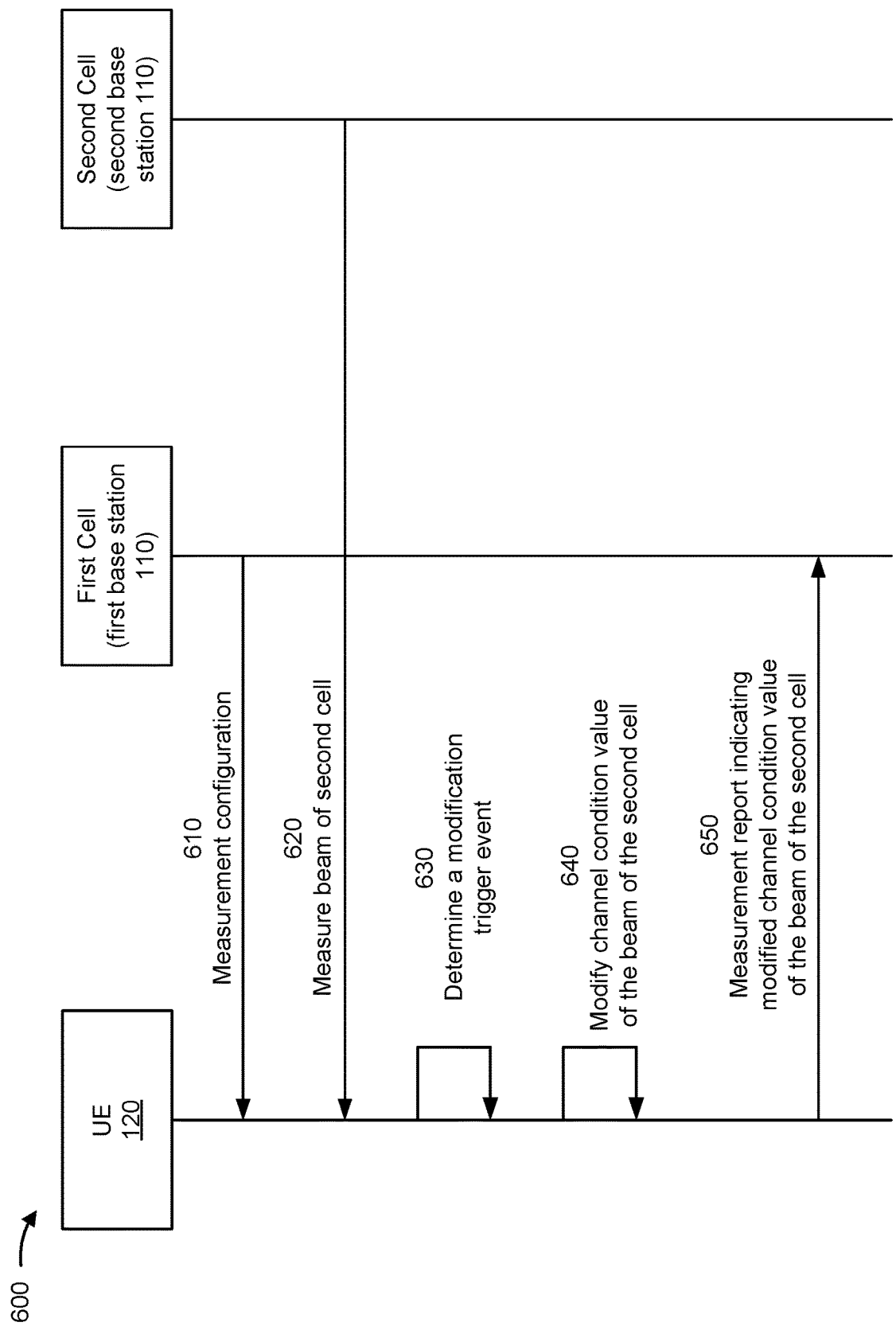
FIGS. 6 and 7 are diagrams illustrating examples associated with improved beam management, in accordance with the present disclosure.

FIG. 6 is a diagram illustrating an example 600 associated with improved beam management, in accordance with the present disclosure. As shown in FIG. 6, a UE 120 may establish a communication connection with a first cell (e.g., a primary cell (PCell)) of a first cell group (e.g., an MCG), associated with a first base station 110. In some aspects, a second cell, associated with a second base station 110, may be a candidate cell for dual connectivity with the first cell (e.g., may be a candidate to serve as a primary secondary cell (PSCell) of a second cell group (e.g., an SCG)). In some aspects, the first cell may be associated with a first RAT (e.g., an LTE RAT, a 4G RAT, and/or the like). The second cell may be associated with the first RAT or with a second RAT (e.g., an NR RAT, a 5G RAT, and/or the like). In some aspects, there may be a plurality of second cells that may be candidates for dual connectivity with the first cell in a similar manner as described herein.

As shown by reference number 610, the UE 120 may receive, from the first base station 110 of the first cell, a measurement configuration. The measurement configuration may indicate a measurement event for reporting measurement values of cells associated with the second RAT to the first base station 110 (e.g., associated with the first RAT). The measurement event may be a B1 measurement event (e.g., for reporting IRAT neighbor cells). The measurement event may be associated with an IRAT cell selection procedure. For example, the measurement event may be associated with a cell selection procedure for selecting a cell associated with the second RAT for dual connectivity with the first cell.

The measurement event may indicate a reporting threshold for reporting measurement values associated with cells of the second RAT. In some aspects, the reporting threshold may indicate a channel condition value (e.g., an RSRP value, a signal-to-noise ratio (SNR) value, and/or the like) that is a threshold channel condition value for reporting channel condition values associated with cells of the second RAT. That is, if the UE 120 measures a beam associated with the second RAT and determines that a channel condition value of the beam associated with the second RAT satisfies the reporting threshold, the UE 120 may report the channel condition value of the beam associated with the second RAT to the first base station 110 associated with the first RAT.

As shown by reference number 620, the UE 120 may measure a beam of the second cell according to the measurement configuration received from the first cell. In some aspects, the UE 120 may measure one or more beams of the second cell. In some aspects, the UE 120 may measure beams from one or more other cells associated with the second RAT. The UE 120 may determine a channel condition value (e.g., an RSRP value, an SNR value, and/or the like) of the beam of the second cell. The measurement of the beam of the second cell may be a Layer 3 (L3) measurement.

In some aspects, the UE 120 may measure the beam of the second cell using a wide beam. A wide beam may be a beam with a large degree of coverage or beam width (e.g., a wide beam may cover 90 degrees and/or the like) in relation to a refined beam with a lower degree of coverage or beam width. In some aspects, a wide beam may be an unrefined beam. The UE 120 may measure the beam of the second cell using the wide beam to reduce an amount of time associated with measuring beams of the second RAT (e.g., measuring the beam of the second cell using refined or narrow beams may require a beam sweeping procedure which may increase the amount of time associated with measuring beams of the second RAT).

As shown by reference number 630, the UE 120 may determine or detect a modification trigger event based at least in part on the measurement of the beam of the second cell. The modification trigger event may indicate that the UE 120 should modify the channel condition value of the beam of the second cell. In some aspects, the modification trigger event may be based at least in part on the measurement event indicated by the measurement configuration. For example, the modification trigger event may be based at least in part on a reporting threshold for reporting channel condition values of the second RAT (e.g., configured in the measurement configuration received from the first base station 110 of the first cell). The modification trigger event may be based at least in part on a difference between the channel condition value of the beam of the second cell and the reporting threshold for reporting channel condition values of the second RAT satisfying a threshold. In some aspects, the threshold may be based at least in part on a beamforming gain value determined by the UE 120. In some aspects, the threshold may be 6 dB, and/or the like (e.g., if the channel condition value of the beam of the second cell is within 6 dB of the reporting threshold for reporting channel condition values of the second RAT, then the UE 120 may determine that the modification trigger event has been detected).

In some aspects, the modification trigger event may be based at least in part on the channel condition value of the beam of the second cell indicating that the beam of the second cell is near a cell edge of the second cell. For example, the UE 120 may determine that the modification trigger event has been detected if the channel condition value of the beam of the second cell satisfies a cell edge threshold. In some aspects, the UE 120 may determine that the modification trigger event has been detected if the channel condition value of the beam of the second cell is less than the cell edge threshold. The cell edge threshold may be pre-configured or stored in the UE 120 or indicated by the first base station 110 of the first cell. In some aspects, the cell edge threshold may be −95 dBm, among other examples.

As shown by reference number 640, the UE 120 may modify the channel condition value of the beam of the second cell. The UE 120 may modify the channel condition value of the beam of the second cell based at least in part on determining the modification trigger event. In some aspects, the UE 120 may modify the channel condition value of the beam of the second cell by a beamforming gain value. The beamforming gain value may be a nominal value to indicate a beamforming gain that may be achieved through beamforming or refining the wide beam used by the UE 120 to measure the beam of the second cell and determine the channel condition value of the beam of the second cell, as described above.

The beamforming gain value may be based at least in part on an antenna module associated with the wide beam used to determine the channel condition value of the beam of the second cell, the wide beam used to determine the channel condition value of the beam of the second cell, and/or determine an availability of a beam level of the antenna module associated with the wide beam used to determine the channel condition value of the beam of the second cell, among other examples. The beamforming gain value may be determined based at least in part on one or more beam characterizations (e.g., an angle of a beam of the second cell, a codebook associated with the wide beam, phase information associated with the wide beam, and/or amplitude information associated with the wide beam), a derivation of the beamforming gain value, and/or an estimation of the beamforming gain value.

For example, a nominal beamforming gain value may apply to all wide beams associated with an antenna module of the UE 120 (e.g., the nominal beamforming gain value may be specific to an antenna module). The nominal beamforming gain value may be an average beamforming gain value that may be expected when performing beamforming or beam refinement using the antenna module. In some aspects, a nominal beamforming gain value may be based at least in part on the wide beam used to measure the beam of the second cell (e.g., the nominal beamforming gain value may be specific to a wide beam of the UE 120). The nominal beamforming gain value may be a beamforming gain value that may be expected when performing beamforming or beam refinement of the wide beam.

In some aspects, a nominal beamforming gain value may be based at least in part on a beam level. For example, a codebook associated with a wide beam (or associated with an antenna module associated with the wide beam) may indicate beams associated with a plurality of levels. A level of beam (e.g., a beam level) may be associated with a particular beam width and a particular beam gain. As the level changes, the beam width and the beam gain may change. As one example, when the beam level increases, the beam width may decrease and the beam gain may increase. The codebook may include a plurality of levels, such as two levels, three levels, or a different number of levels. The usage of the beam levels may improve efficiency of beam refinement operations of the UE 120. For example, the usage of three beam levels may provide a desirable balance between beam width and beamforming gain, since a wide beam (level), an intermediate beam (level), and a narrow beam (level) can be formed using a three-level codebook approach. In another example, a plurality of beam levels may include a wide beam level and one or more refined beam levels. The wide beam level may be associated with one or more beams of different directions (e.g., different spatial directions) of a beam width wider than beams of the one or more refined beam levels. In other words, beams of the one or more refined beam levels may have a width that is narrower than the beam width associated with the wide beam level.

In some aspects, the codebook may indicate a parent-child relationship of two or more beams. A parent beam may be a beam associated with a lower level (e.g., a larger beam width and a lower beam gain) and a child beam may be a beam associated with a higher level. The UE 120 may move from a parent beam to a corresponding child beam as part of a beam refinement procedure. For example, the UE 120 may perform measurements on child beams corresponding to a parent beam, or on parent beams corresponding to a child beam, as part of a beam refinement procedure.

In some aspects, the UE 120 may determine a highest available level associated with a of the widest beam width to determine a beamforming gain. An available beam level may be a beam level in which all beams included in the level are available. An availability of a beam included in the beam level may be based at least in part on an operating condition of the UE 120 (e.g., a thermal condition, a power usage condition, a battery condition, a maximum permissible exposure (MPE) condition, a dynamic choice of antenna numbers from a set of antenna modules supported by the UE 120, a preferred subarray type supported by the UE 120, a use case (e.g., a data rate use case and/or a latency use case), or another type of operating condition). For example, the UE 120 may determine that one or more beams included in a level are not available or are disqualified based at least in part on the operating condition. As a result, the UE 120 may not use a beamforming gain value associated with that level when modifying the channel condition value of the beam of the second cell.

In some aspects, the UE 120 may determine an available level starting at a highest beam level (e.g., a beam level associated with a smallest beam width and/or a largest beamforming gain value). If the UE 120 determines that the highest level is available, the UE 120 may determine that the beamforming gain value is the beamforming gain value associated with the highest level. If the UE 120 determines that the highest level is not available, the UE 120 may determine whether the next highest beam level is available. The UE 120 may repeat this process until the UE 120 determines a highest available beam level. The UE 120 may determine that the beamforming gain value is the beamforming gain value associated with the highest available beam level.

The UE 120 may modify the channel condition value of the beam of the second cell by the beamforming gain value. For example, the UE 120 may add the beamforming gain value to the channel condition value of the beam of the second cell. As a result, the UE 120 may determine whether to report the channel condition value of the beam of the second cell using the modified channel condition value. The modified channel condition value may enable the UE 120 to use a more accurate channel condition value of the beam of the second cell (e.g., a channel condition value of the beam of the second cell after a beam refinement procedure is performed) while also conserving resources (e.g., time resources and/or power resources) by measuring the beam of the second cell using a wide beam (e.g., rather than one or more narrow beams or one or more refined beams).

As shown by reference number 650, the UE 120 may transmit a measurement report, to the first base station 110 of the first cell, indicating the modified channel condition value of the beam of the second cell. For example, the UE 120 may determine that the modified channel condition value of the beam of the second cell satisfies a reporting threshold for reporting channel condition values of the second RAT. The UE 120 may transmit the measurement report indicating the modified channel condition value of the beam of the second cell based at least in part on the determination that the modified channel condition value of the beam of the second cell satisfies the reporting threshold for reporting channel condition values of the second RAT (e.g., if the modified channel condition value of the beam of the second cell does not satisfy the reporting threshold for reporting channel condition values of the second RAT, the UE 120 may not transmit the measurement report).

The first base station 110 of the first cell may receive the measurement report indicating the modified channel condition value of the beam of the second cell. The first base station 110 may transmit an indication to the UE 120 to add the second cell as a PSCell for dual connectivity with the first cell. The UE 120 may perform a beam refinement procedure associated with adding the second cell as the PSCell. As a result, the UE 120 may materialize the beamforming gain value through performing the beam refinement procedure when adding the second cell as the PSCell. Thus, after adding the second cell as the PSCell, the UE 120 may operate in a dual connectivity mode with the first cell as a PCell of an MCG and the second cell as a PSCell of an SCG. The dual connectivity mode may improve network performance and increase throughput of the UE 120.

As a result, the UE 120 improves beam management by modifying the channel condition value of the beam of the second cell by the expected beamforming gain value. The modified channel condition value of the beam of the second cell enables the UE 120 to report the second cell to the first cell, while also maintaining resources conserved by using a wide beam to measure the beam of the second cell. Reporting the modified channel condition value improves beam management by enabling the first cell to add the second cell as a PSCell of an SCG, thereby improving network performance associated with the UE 120 operating in a dual connectivity mode.

As indicated above, FIG. 6 is provided as an example. Other examples may differ from what is described with respect to FIG. 6.

Figure 7:
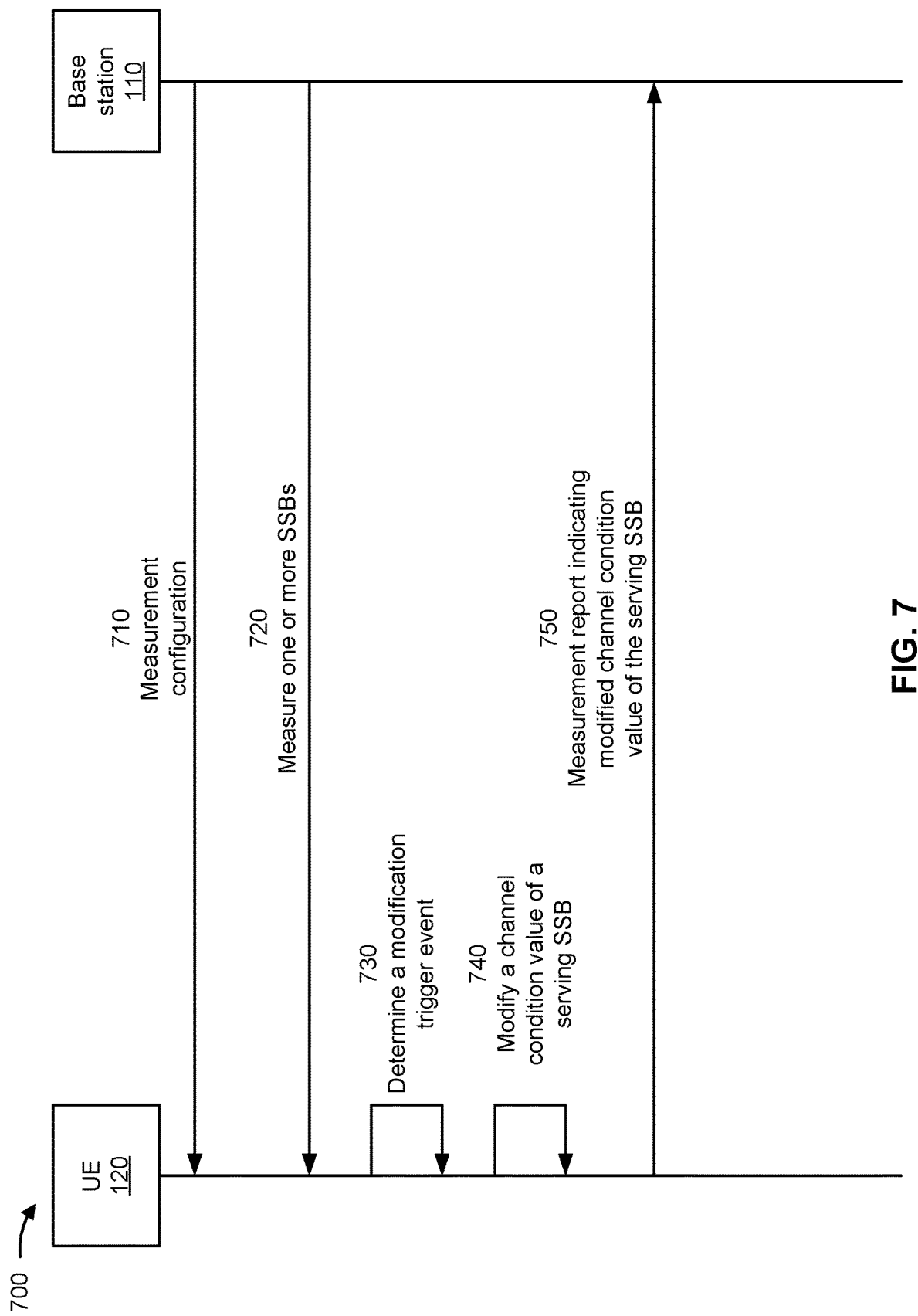

FIG. 7 is a diagram illustrating an example 700 associated with improved beam management, in accordance with the present disclosure. As shown in FIG. 7, a base station 110 and a UE 120 may communicate with one another in a wireless network (e.g., wireless network 100).

As shown by reference number 710, the base station 110 may transmit, to the UE 120, a measurement configuration. The measurement configuration may indicate conditions for reporting channel condition values (e.g., RSRP values, SNR values, and/or the like) of different beams to the base station 110. The base station 110 may use the reported channel condition values for beam management.

The measurement configuration may indicate a measurement event associated with a beam switch procedure. In some aspects, the measurement event may be associated with an L1-RSRP measurement report. For example, the measurement event may indicate that the UE 120 is to measure one or more SSBs transmitted by the base station 110 and report one or more highest RSRP values of the one or more SSBs to the base station 110. The base station 110 may use the L1-RSRP measurement report to select a best SSB to be a serving SSB for the UE 120.

As shown by reference number 720, the UE 120 may measure one or more SSBs that are transmitted by the base station 110 according to the measurement configuration. The one or more SSBs may be transmitted on one or more transmit beams of the base station 110. The UE 120 may measure the one or more SSBs using a receive beam of the UE 120. The UE 120 may determine a channel condition value of the one or more SSBs based at least in part on the measurement of the one or more SSBs. The measurements of the one or more SSBs may be L1 measurements.

As shown by reference number 730, the UE 120 may determine a modification trigger event. The modification trigger event may be based at least in part on the one or more measurements of the one or more SSBs. The modification trigger event may be an event indicating that the UE 120 should modify an RSRP value of a serving SSB when transmitting the L1-RSRP measurement report. In some aspects, the modification trigger event may be based at least in part on a channel condition value of a serving SSB. For example, based at least in part on a previous L1-RSRP measurement report, the base station 110 may configure or indicate a serving SSB for the UE 120 (e.g., using medium access control (MAC) control element (MAC-CE) signaling). The serving SSB may be the SSB associated with the highest RSRP value in the previous L1-RSRP measurement report.

The UE 120 may determine the modification trigger event based at least in part on determining that the serving SSB does not have a highest RSRP value among the one or more SSBs. For example, the UE 120 may determine that another SSB has a higher RSRP value than the RSRP value of the serving SSB. The UE 120 may determine the modification trigger event based at least in part on determining that a difference between the highest RSRP value (e.g., of the other SSB) and the RSRP value of a serving SSB satisfies an RSRP threshold. For example, the UE 120 may determine that the RSRP value of the serving SSB is within a threshold value of the highest RSRP.

In some aspects, the UE 120 may determine the modification trigger event based at least in part on an amount of time since a last SSB switch (e.g., an amount of time since the base station 110 indicated a switch from a previous serving SSB to the current serving SSB). The UE 120 may determine the modification trigger event based at least in part on determining that the amount of time since the last SSB switch satisfies a time threshold. The time threshold may be 1 second, 2 second, and/or 4 seconds, among other examples. In some aspects, if the UE 120 determines that the amount of time since the last SSB switch does not satisfy the time threshold (e.g., is greater than or equal to the time threshold), then the UE 120 may determine that the modification trigger event has not been satisfied (e.g., even if the difference between the highest RSRP value and the RSRP value of a serving SSB satisfies the RSRP threshold).

In some aspects, the UE 120 may determine the modification trigger event based at least in part on the channel condition value of the serving SSB. For example, if the channel condition value of the serving SSB is poor, then the UE 120 may not determine that the modification trigger event is detected or satisfied, such that the channel condition value of the serving SSB is not modified (e.g., to enable the base station 110 to switch from the serving SSB with a poor channel condition value). In some aspects, the UE 120 may determine or detect the modification trigger event based at least in part on determining that the RSRP value of the serving SSB satisfies a serving RSRP threshold. In some aspects, the UE 120 may determine or detect the modification trigger event based at least in part on determining that an SNR of the serving SSB satisfies a serving SNR threshold. For example, if the RSRP value of the serving SSB does not satisfy the serving RSRP threshold and/or the SNR value of the serving SSB does not satisfy the serving SNR threshold, then the UE 120 may determine that the modification trigger event has not been satisfied (e.g., even if the difference between the highest RSRP value and the RSRP value of a serving SSB satisfies the RSRP threshold and/or the amount of time since the last SSB switch satisfies the time threshold).

In some aspects, the UE 120 may determine or detect the modification trigger event based at least in part on determining that the difference between the highest RSRP value and the RSRP value of a serving SSB satisfies the RSRP threshold, determining that the amount of time since the last SSB switch satisfies the time threshold, and/or determining that the RSRP value of the serving SSB satisfies the serving RSRP threshold (and/or the SNR value of the serving SSB satisfies the serving SNR threshold). In some aspects, the thresholds (e.g., the RSRP threshold, the time threshold, the serving RSRP threshold, the serving SNR threshold, and/or the like) may be pre-configured or stored by the UE 120. In some aspects, the thresholds may be indicated or configured by the base station 110.

As shown by reference number 740, the UE 120 may modify the channel condition value of the serving SSB. For example, the UE 120 may modify the RSRP value of the serving SSB (e.g., the measured RSRP value). In some aspects, the UE 120 may modify the channel condition value of the serving SSB based at least in part on determining the modification trigger event. The UE 120 may modify the RSRP value of the serving SSB by an RSRP modification value. The RSRP modification value may be based at least in part on a value associated with the RSRP threshold. For example, if the RSRP threshold indicates that the RSRP value of the serving SSB must be within 1 dB of the highest RSRP, the RSRP modification value may be 1 dB or more. In this way, the RSRP value of the serving SSB may be modified to become the highest RSRP value.

The modification of the RSRP value of the serving SSB may introduce hysteresis into the reporting of the L1-RSRP measurement report. For example, the modification of the RSRP value of the serving SSB may ensure that, for a limited time period (e.g., based at least in part on the time threshold), the serving SSB is not switched by the base station 110 due to minor fluctuations in RSRP values of the one or more SSBs.

As shown by reference number 750, the UE 120 may transmit, to the base station 110, the L1-RSRP measurement report indicating the modified channel condition value (e.g., the modified RSRP value) of the serving SSB. The base station 110 may receive the L1-RSRP measurement report and determine that the modified RSRP of the serving SSB is the highest RSRP value. As a result, the base station 110 may not switch the serving SSB to another SSB, even if the other SSB has a higher RSRP as measured by the UE 120.

As a result, frequent switches between SSBs as the serving SSB due to minor fluctuations in RSRP values of the SSBs may be avoided by transmitting the L1-RSRP measurement report indicating the modified RSRP value of the serving SSB. Transmitting the L1-RSRP measurement report indicating the modified RSRP value of the serving SSB improves beam management by improving network performance, as the UE 120 and the base station 110 may reduce a number of beam switches for different SSBs. Additionally, transmitting the L1-RSRP measurement report indicating the modified RSRP value of the serving SSB improves beam management by reducing a signaling overhead associated with frequent switches between SSBs as the serving SSB.

As indicated above, FIG. 7 is provided as an example. Other examples may differ from what is described with respect to FIG. 7.

Figure 8:
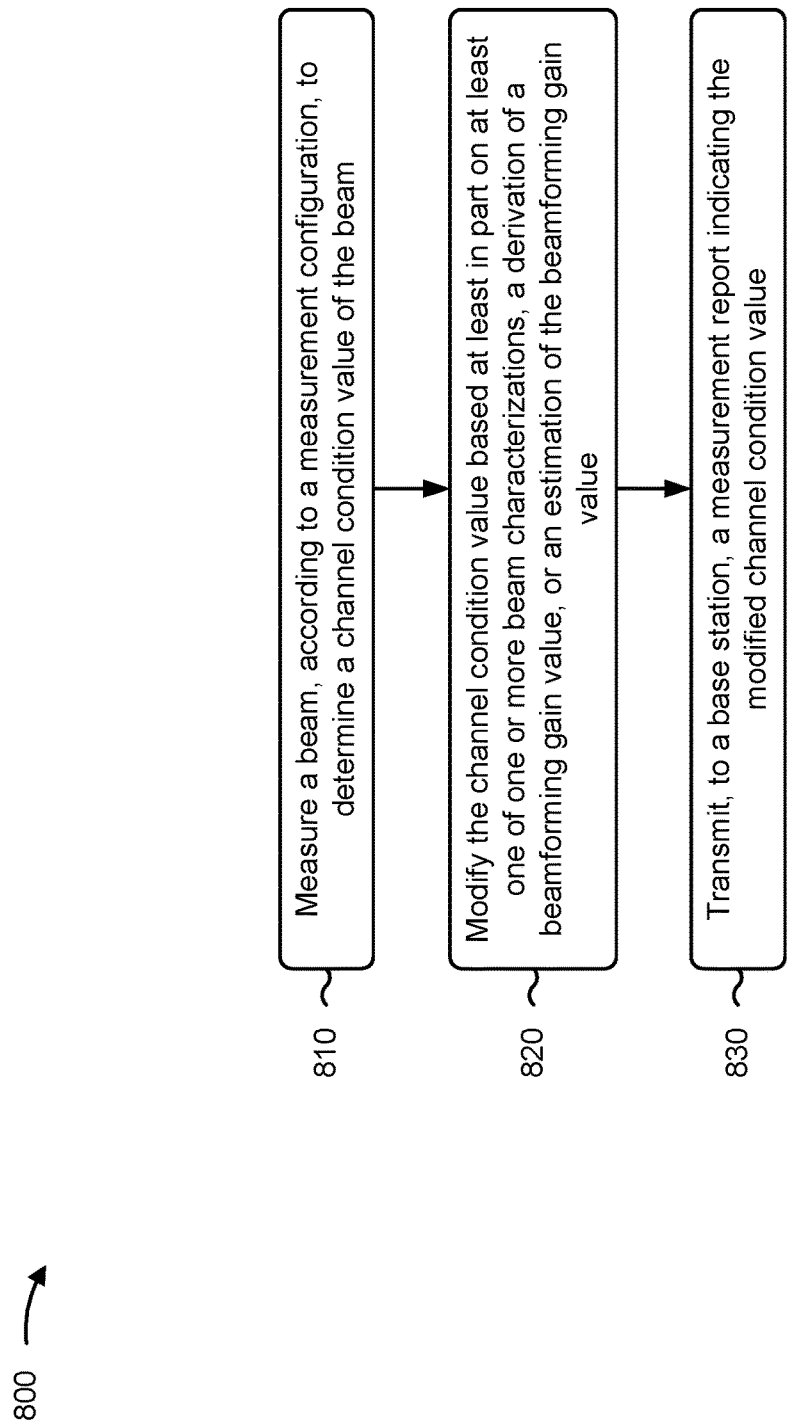
FIG. 8 is a diagram illustrating an example process associated with improved beam management, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with techniques for improved beam management.

As shown in FIG. 8, in some aspects, process 800 may include measuring a beam, according to a measurement configuration, to determine a channel condition value of the beam (block 810). For example, the UE (e.g., using receive processor 258, transmit processor 264, controller/processor 280, memory 282, and/or measurement component 908, depicted in FIG. 9) may measure a beam, according to a measurement configuration, to determine a channel condition value of the beam, as described above.

As further shown in FIG. 8, in some aspects, process 800 may include modifying the channel condition value based at least in part on at least one of one or more beam characterizations, a derivation of a beamforming gain value, or an estimation of the beamforming gain value (block 820). For example, the UE (e.g., using receive processor 258, transmit processor 264, controller/processor 280, memory 282, and/or modification component 910, depicted in FIG. 9) may modify the channel condition value based at least in part on at least one of one or more beam characterizations, a derivation of a beamforming gain value, or an estimation of the beamforming gain value, as described above.

As further shown in FIG. 8, in some aspects, process 800 may include transmitting, to a base station, a measurement report indicating the modified channel condition value (block 830). For example, the UE (e.g., using receive processor 258, transmit processor 264, controller/processor 280, memory 282, and/or transmission component 904, depicted in FIG. 9) may transmit, to a base station, a measurement report indicating the modified channel condition value, as described above.

Process 800 may include additional aspects, such as any single aspect or any combination of aspects described below and/or in connection with one or more other processes described elsewhere herein.

In a first aspect, process 800 includes determining a modification trigger event based at least in part on the measurement of the beam, wherein modifying the channel condition value is based at least in part on the determination of the modification trigger event.

In a second aspect, alone or in combination with the first aspect, process 800 includes establishing a communication connection using a first RAT, wherein measuring the beam, according to the measurement configuration, to determine the channel condition value of the beam includes measuring a beam of a second RAT, according to the measurement configuration received via the communication connection, to determine a channel condition value of the beam of the second RAT.

In a third aspect, alone or in combination with one or more of the first and second aspects, the first RAT is an LTE RAT and the second RAT is an NR RAT.

In a fourth aspect, alone or in combination with one or more of the first through third aspects, the measurement configuration is associated with an IRAT cell selection procedure, and the measurement configuration indicates a measurement event for reporting measurement values for the IRAT cell selection procedure.

In a fifth aspect, alone or in combination with one or more of the first through fourth aspects, the measurement event indicates a reporting threshold for reporting measurement values of an NR cell associated with the IRAT cell selection procedure.

In a sixth aspect, alone or in combination with one or more of the first through fifth aspects, measuring the beam, according to the measurement configuration, to determine the channel condition value of the beam comprises measuring the beam of the second RAT, according to the measurement configuration, using a wide beam to determine the channel condition value of the beam of the second RAT.

In a seventh aspect, alone or in combination with one or more of the first through sixth aspects, process 800 includes determining a beamforming gain value associated with the measurement of the beam of the second RAT, wherein the beamforming gain value is based at least in part on at least one of: an antenna module associated with a wide beam used to determine the channel condition value of the beam of the second RAT, the wide beam used to determine the channel condition value of the beam of the second RAT, or an available beam level of the antenna module associated with the wide beam used to determine the channel condition value of the beam of the second RAT.

In an eighth aspect, alone or in combination with one or more of the first through seventh aspects, determining the beamforming gain value is based at least in part on: one or more beam characterizations, a derivation of the beamforming gain value, or an estimation of the beamforming gain value.

In a ninth aspect, alone or in combination with one or more of the first through eighth aspects, process 800 includes determining a modification trigger event based on at least one of: a difference between the channel condition value of the beam of the second RAT and a reporting threshold for reporting channel condition values of the second RAT satisfies a threshold, or the channel condition value of the beam of the second RAT satisfies a cell edge threshold.

In a tenth aspect, alone or in combination with one or more of the first through ninth aspects, modifying the channel condition value comprises modifying the channel condition value of the beam of the second RAT by a beamforming gain value.

In an eleventh aspect, alone or in combination with one or more of the first through tenth aspects, modifying the channel condition value of the beam of the second RAT by the beamforming gain value comprises determining a beam level, of one or more beam levels associated with an antenna module of the UE, with all beams included in the beam level available, and modifying the channel condition value of the beam of the second RAT by a beamforming gain value associated with the beam level with all beams included in the beam level available.

In a twelfth aspect, alone or in combination with one or more of the first through eleventh aspects, determining the beam level with all beams included in the beam level available comprises determining whether each beam included in the beam level is available, wherein an availability of a beam included in the beam level is based at least in part on an operating condition of the UE.

In a thirteenth aspect, alone or in combination with one or more of the first through twelfth aspects, transmitting, to the base station, the measurement report indicating the modified channel condition value comprises determining that a modified channel condition value of the beam of the second RAT satisfies a reporting threshold for reporting channel condition values of the second RAT, and transmitting, to the base station, the measurement report indicating the modified channel condition value of the beam of the second RAT based at least in part on the determination that the modified channel condition value of the beam of the second RAT satisfies the reporting threshold for reporting channel condition values of the second RAT.

In a fourteenth aspect, alone or in combination with one or more of the first through thirteenth aspects, the measurement configuration is associated with a L1-RSRP measurement report.

In a fifteenth aspect, alone or in combination with one or more of the first through fourteenth aspects, measuring the beam, according to the measurement configuration, to determine the channel condition value of the beam comprises measuring one or more SSBs to determine RSRP values of the one or more SSBs, and determining that an RSRP value of a serving SSB, of the one or more SSBs, is not a highest RSRP value based at least in part on the measurement of the one or more SSBs.

In a sixteenth aspect, alone or in combination with one or more of the first through fifteenth aspects, process 800 includes determining a modification trigger event based at least in part on the measurement of the beam.

In a seventeenth aspect, alone or in combination with one or more of the first through sixteenth aspects, determining the modification trigger event comprises determining that an RSRP value of an SSB is a highest RSRP value, and determining that a difference between the RSRP value of the SSB and the RSRP value of a serving SSB satisfies an RSRP threshold.

In an eighteenth aspect, alone or in combination with one or more of the first through seventeenth aspects, determining the modification trigger event comprises determining an amount of time since a last SSB switch, and determining that the amount of time since the last SSB switch satisfies a time threshold.

In a nineteenth aspect, alone or in combination with one or more of the first through eighteenth aspects, determining the modification trigger event comprises determining that at least one of an RSRP value of a serving SSB satisfies a serving RSRP threshold, or an SNR of the serving SSB satisfies a serving SNR threshold.

In a twentieth aspect, alone or in combination with one or more of the first through nineteenth aspects, modifying the channel condition value comprises modifying an RSRP value of a serving SSB by an RSRP modification value, wherein the RSRP modification value is based at least in part on a value associated with an RSRP threshold.

In a twenty-first aspect, alone or in combination with one or more of the first through twentieth aspects, transmitting, to the base station, the measurement report indicating the modified channel condition value comprises transmitting, to the base station, an L1-RSRP measurement report indicating a modified RSRP value of a serving SSB.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
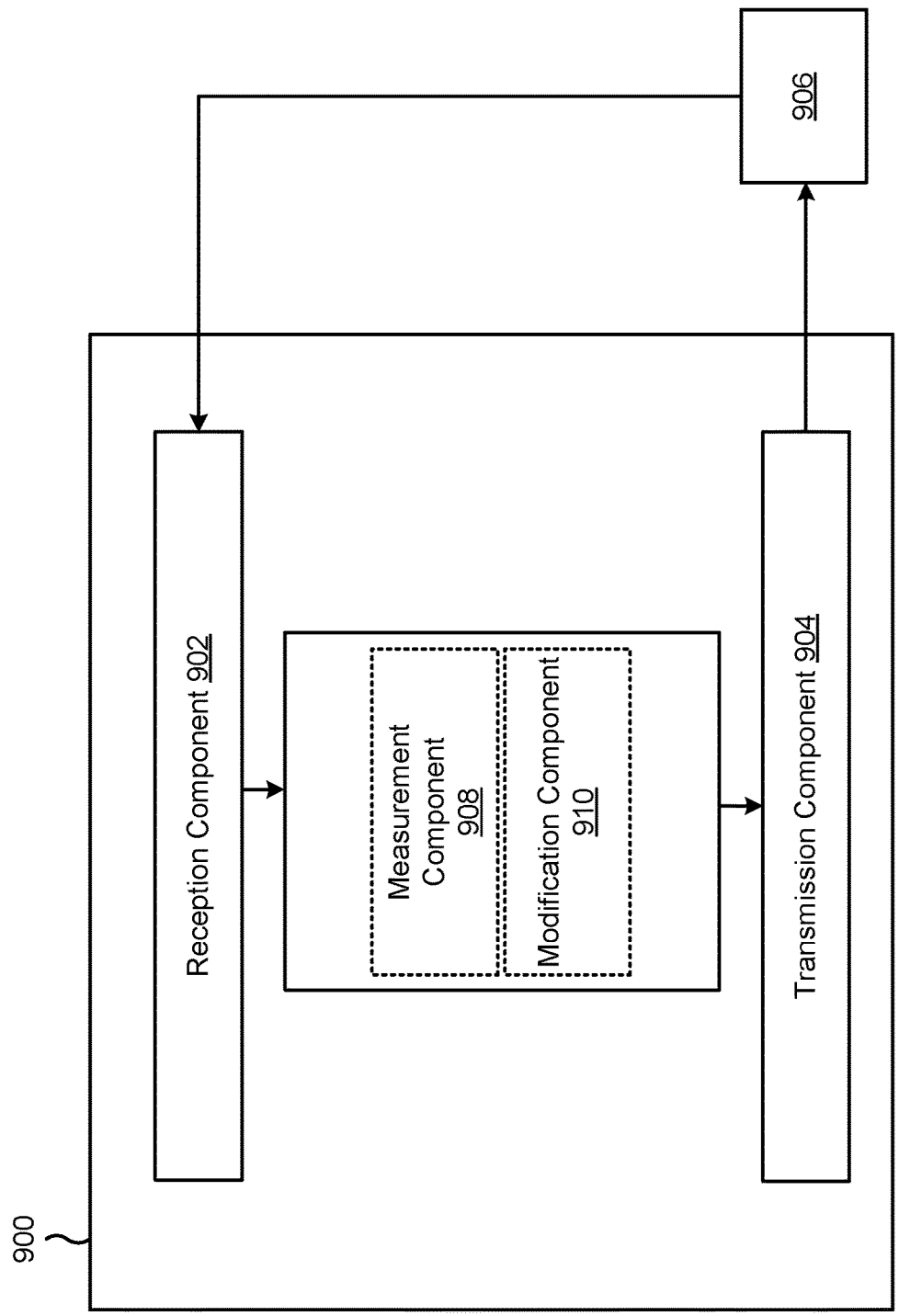
FIG. 9 is a block diagram of an example apparatus for wireless communication, in accordance with the present disclosure.

FIG. 9 is a block diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a measurement component 908, a modification component 910, among other examples.

In some aspects, the apparatus 900 may be configured to perform one or more operations described herein in connection with FIG. 6-7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the user equipment described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the user equipment described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the user equipment described above in connection with FIG. 2. In some aspects, the transmission component 904 may be co-located with the reception component 902 in a transceiver.

The measurement component 908 may measure a beam, according to a measurement configuration, to determine a channel condition value of the beam. The modification component 910 may modify the channel condition value based at least in part on at least one of one or more beam characterizations, a derivation of a beamforming gain value, or an estimation of the beamforming gain value. The transmission component 904 may transmit, to a base station, a measurement report indicating the modified channel condition value.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some aspects of the present disclosure:

Aspect 1: A method of wireless communication performed by a user equipment (UE), comprising: measuring a beam, according to a measurement configuration, to determine a channel condition value of the beam; modifying the channel condition value; and transmitting, to a base station, a measurement report indicating the modified channel condition value.

Aspect 2: The method of aspect 1, further comprising: determining a modification trigger event based at least in part on the measurement of the beam, wherein modifying the channel condition value is based at least in part on the determination of the modification trigger event.

Aspect 3: The method of any of aspects 1-2, further comprising: establishing a communication connection using a first radio access technology (RAT), wherein measuring the beam, according to the measurement configuration, to determine the channel condition value of the beam includes: measuring a beam of a second RAT, according to the measurement configuration received via the communication connection, to determine a channel condition value of the beam of the second RAT.

Aspect 4: The method of aspect 3, wherein the first RAT is a Long Term Evolution (LTE) RAT and the second RAT is a New Radio (NR) RAT.

Aspect 5: The method of any of aspects 3-4, wherein the measurement configuration is associated with an inter-RAT (IRAT) cell selection procedure, and wherein the measurement configuration indicates a measurement event for reporting measurement values for the IRAT cell selection procedure.

Aspect 6: The method of aspect 5, wherein the measurement event indicates a reporting threshold for reporting measurement values of a New Radio (NR) cell associated with the IRAT cell selection procedure.

Aspect 7: The method of any of aspects 3-6, wherein measuring the beam, according to the measurement configuration, to determine the channel condition value of the beam comprises: measuring the beam of the second RAT, according to the measurement configuration, using a wide beam to determine the channel condition value of the beam of the second RAT.

Aspect 8: The method of any of aspects 3-7, further comprising: determining a beamforming gain value associated with the measurement of the beam of the second RAT, wherein the beamforming gain value is based at least in part on at least one of: an antenna module associated with a wide beam used to determine the channel condition value of the beam of the second RAT, the wide beam used to determine the channel condition value of the beam of the second RAT, or an available beam level of the antenna module associated with the wide beam used to determine the channel condition value of the beam of the second RAT.

Aspect 9: The method of aspect 8, wherein determining the beamforming gain value is based at least in part on: one or more beam characterizations, a derivation of the beamforming gain value, or an estimation of the beamforming gain value.

Aspect 10: The method of any of aspects 3-9, further comprising: determining a modification trigger event based on at least one of: a difference between the channel condition value of the beam of the second RAT and a reporting threshold for reporting channel condition values of the second RAT satisfies a threshold, or the channel condition value of the beam of the second RAT satisfies a cell edge threshold.

Aspect 11: The method of any of aspects 3-10, wherein modifying the channel condition value comprises: modifying the channel condition value of the beam of the second RAT by a beamforming gain value.

Aspect 12: The method of aspect 11, wherein modifying the channel condition value of the beam of the second RAT by the beamforming gain value comprises: determining a beam level, of one or more beam levels associated with an antenna module of the UE, with all beams included in the beam level available; and modifying the channel condition value of the beam of the second RAT by a beamforming gain value associated with the beam level with all beams included in the beam level available.

Aspect 13: The method of aspect 12, wherein determining the beam level with all beams included in the beam level available comprises: determining whether each beam included in the beam level is available, wherein an availability of a beam included in the beam level is based at least in part on an operating condition of the UE.

Aspect 14: The method of any of aspects 3-13, wherein transmitting, to the base station, the measurement report indicating the modified channel condition value comprises: determining that a modified channel condition value of the beam of the second RAT satisfies a reporting threshold for reporting channel condition values of the second RAT; and transmitting, to the base station, the measurement report indicating the modified channel condition value of the beam of the second RAT based at least in part on the determination that the modified channel condition value of the beam of the second RAT satisfies the reporting threshold for reporting channel condition values of the second RAT.

Aspect 15: The method of any of aspects 1-2, wherein the measurement configuration is associated with a Layer 1 (L1) reference signal receive power (RSRP) measurement report.

Aspect 16: The method of aspect 15, wherein measuring the beam, according to the measurement configuration, to determine the channel condition value of the beam comprises: measuring one or more synchronization signal blocks (SSBs) to determine RSRP values of the one or more SSBs; and determining that an RSRP value of a serving SSB, of the one or more SSBs, is not a highest RSRP value based at least in part on the measurement of the one or more SSBs.

Aspect 17: The method of any of aspects 15-16, further comprising: determining a modification trigger event based at least in part on the measurement of the beam.

Aspect 18: The method of aspect 17, wherein determining the modification trigger event comprises: determining that an RSRP value of an SSB is a highest RSRP value; and determining that a difference between the RSRP value of the SSB and the RSRP value of a serving SSB satisfies an RSRP threshold.

Aspect 19: The method of any of aspects 17-18, wherein determining the modification trigger event comprises: determining an amount of time since a last SSB switch; and determining that the amount of time since the last SSB switch satisfies a time threshold.

Aspect 20: The method of any of aspects 17-19, wherein determining the modification trigger event comprises: determining that at least one of: an RSRP value of a serving SSB satisfies a serving RSRP threshold, or a signal-to-noise ratio (SNR) of the serving SSB satisfies a serving SNR threshold.

Aspect 21: The method of any of aspects 15-20, wherein modifying the channel condition value comprises: modifying an RSRP value of a serving SSB by an RSRP modification value, wherein the RSRP modification value is based at least in part on a value associated with an RSRP threshold.

Aspect 22: The method of any of aspects 15-21, wherein transmitting, to the base station, the measurement report indicating the modified channel condition value comprises: transmitting, to the base station, an L1-RSRP measurement report indicating a modified RSRP value of a serving SSB.

Aspect 23: A method of wireless communication performed by a user equipment (UE), comprising: measuring a beam, according to a measurement configuration, to determine a channel condition value of the beam; modifying the channel condition value based at least in part on at least one of one or more beam characterizations, a derivation of a beamforming gain value, or an estimation of the beamforming gain value; and transmitting, to a base station, a measurement report indicating the modified channel condition value.

Aspect 24: The method of aspect 23, further comprising: determining a modification trigger event based at least in part on the measurement of the beam, wherein modifying the channel condition value is based at least in part on the determination of the modification trigger event.

Aspect 25: The method of any of aspects 23-24, further comprising: establishing a communication connection using a first radio access technology (RAT), wherein measuring the beam, according to the measurement configuration, to determine the channel condition value of the beam includes: measuring a beam of a second RAT, according to the measurement configuration received via the communication connection, to determine a channel condition value of the beam of the second RAT.

Aspect 26: The method of aspect 25, wherein the first RAT is a Long Term Evolution (LTE) RAT and the second RAT is a New Radio (NR) RAT.

Aspect 27: The method of any of aspects 23-26, wherein the measurement configuration is associated with an inter-RAT (IRAT) cell selection procedure, and wherein the measurement configuration indicates a measurement event for reporting measurement values for the IRAT cell selection procedure.

Aspect 28: The method of aspect 27, wherein the measurement event indicates a reporting threshold for reporting measurement values of a New Radio (NR) cell associated with the IRAT cell selection procedure.

Aspect 29: The method of any of aspects 23-28, wherein measuring the beam, according to the measurement configuration, to determine the channel condition value of the beam comprises: measuring the beam, according to the measurement configuration, using a wide beam to determine the channel condition value of the beam.

Aspect 30: The method of any of aspects 23-29, further comprising: determining the beamforming gain value associated with the measurement of the beam, wherein the beamforming gain value is based at least in part on at least one of: an antenna module associated with a wide beam used to determine the channel condition value of the beam, the wide beam used to determine the channel condition value of the beam, or an available beam level of the antenna module associated with the wide beam used to determine the channel condition value of the beam.

Aspect 31: The method of any of aspects 23-30, further comprising: determining the beamforming gain value is based at least in part on: the one or more beam characterizations, the derivation of the beamforming gain value, or the estimation of the beamforming gain value.

Aspect 32: The method of any of aspects 23-31, further comprising: determining a modification trigger event based on at least one of: a difference between the channel condition value of the beam of the RAT and a reporting threshold for reporting channel condition values of the RAT satisfies a threshold, or the channel condition value of the beam of the RAT satisfies a cell edge threshold.

Aspect 33: The method of any of aspects 23-32, wherein modifying the channel condition value comprises: modifying the channel condition value of the beam by the beamforming gain value.

Aspect 34: The method of aspect 33, wherein modifying the channel condition value of the beam by the beamforming gain value comprises: determining a beam level, of one or more beam levels associated with an antenna module of the UE, with all beams included in the beam level available; and modifying the channel condition value of the beam by a beamforming gain value associated with the beam level with all beams included in the beam level available.

Aspect 35: The method of aspect 34, wherein determining the beam level with all beams included in the beam level available comprises: determining whether each beam included in the beam level is available, wherein an availability of a beam included in the beam level is based at least in part on an operating condition of the UE.

Aspect 36: The method of any of aspects 23-35, wherein transmitting, to the base station, the measurement report indicating the modified channel condition value comprises: determining that a modified channel condition value of the beam of a radio access technology (RAT) satisfies a reporting threshold for reporting channel condition values of the RAT; and transmitting, to the base station, the measurement report indicating the modified channel condition value of the beam of the RAT based at least in part on the determination that the modified channel condition value of the beam of the RAT satisfies the reporting threshold for reporting channel condition values of the RAT.

Aspect 37: An apparatus for wireless communication at a device, comprising a processor; memory coupled with the processor; and instructions stored in the memory and executable by the processor to cause the apparatus to perform the method of one or more aspects of aspects 1-22.

Aspect 38: A device for wireless communication, comprising a memory and one or more processors coupled to the memory, the memory and the one or more processors configured to perform the method of one or more aspects of aspects 1-22.

Aspect 39: An apparatus for wireless communication, comprising at least one means for performing the method of one or more aspects of aspects 1-22.

Aspect 40: A non-transitory computer-readable medium storing code for wireless communication, the code comprising instructions executable by a processor to perform the method of one or more aspects of aspects 1-22.

Aspect 41: A non-transitory computer-readable medium storing a set of instructions for wireless communication, the set of instructions comprising one or more instructions that, when executed by one or more processors of a device, cause the device to perform the method of one or more aspects of aspects 1-22.

Aspect 42: An apparatus for wireless communication at a device, comprising a processor; memory coupled with the processor; and instructions stored in the memory and executable by the processor to cause the apparatus to perform the method of one or more aspects of aspects 23-36.

Aspect 43: A device for wireless communication, comprising a memory and one or more processors coupled to the memory, the memory and the one or more processors configured to perform the method of one or more aspects of aspects 23-36.

Aspect 44: An apparatus for wireless communication, comprising at least one means for performing the method of one or more aspects of aspects 23-36.

Aspect 45: A non-transitory computer-readable medium storing code for wireless communication, the code comprising instructions executable by a processor to perform the method of one or more aspects of aspects 23-36.

Aspect 46: A non-transitory computer-readable medium storing a set of instructions for wireless communication, the set of instructions comprising one or more instructions that, when executed by one or more processors of a device, cause the device to perform the method of one or more aspects of aspects 23-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    establishing a first communication connection using a first radio access technology (RAT);
    measuring a beam of a second RAT, according to a measurement configuration received via the first communication connection, to determine a channel condition value of the beam;
    modifying the channel condition value based at least in part on at least one of one or more beam characterizations, a derivation of a beamforming gain value, or an estimation of the beamforming gain value; and
    transmitting, to a network entity, a measurement report indicating the modified channel condition value.

2. The method of claim 1, further comprising:
    determining a modification trigger event based at least in part on the measurement of the beam,
        wherein modifying the channel condition value is based at least in part on the determination of the modification trigger event.

3. The method of claim 1, wherein the first RAT is a Long Term Evolution (LTE) RAT and the second RAT is a New Radio (NR) RAT.

4. The method of claim 1, wherein the measurement configuration is associated with an inter-RAT (IRAT) cell selection procedure, and
    wherein the measurement configuration indicates a measurement event for reporting measurement values for the IRAT cell selection procedure.

5. The method of claim 4, wherein the measurement event indicates a reporting threshold for reporting measurement values of a New Radio (NR) cell associated with the IRAT cell selection procedure.

6. The method of claim 1, wherein measuring the beam comprises:
    measuring the beam using a wide beam to determine the channel condition value of the beam.

7. The method of claim 1, further comprising:
    determining the beamforming gain value associated with the measurement of the beam, wherein the beamforming gain value is based at least in part on at least one of:
        an antenna module associated with a wide beam used to determine the channel condition value of the beam,
        the wide beam used to determine the channel condition value of the beam, or
        an available beam level of the antenna module associated with the wide beam used to determine the channel condition value of the beam.

8. The method of claim 1, further comprising:
    determining the beamforming gain value based at least in part on:
        the one or more beam characterizations,
        the derivation of the beamforming gain value, or
        the estimation of the beamforming gain value.

9. The method of claim 1, further comprising:
determining a modification trigger event based on at least one of:
a difference between the channel condition value of the beam and a reporting threshold for reporting channel condition values of the second RAT satisfies a threshold, or
the channel condition value of the beam satisfies a cell edge threshold.

10. The method of claim 1, wherein modifying the channel condition value comprises:
modifying the channel condition value of the beam by the beamforming gain value.

11. The method of claim 10, wherein modifying the channel condition value of the beam by the beamforming gain value comprises:
determining a beam level, of one or more beam levels associated with an antenna module of the UE, with all beams included in the beam level available; and
modifying the channel condition value of the beam by a beamforming gain value associated with the beam level with all beams included in the beam level available.

12. The method of claim 11, wherein determining the beam level with all beams included in the beam level available comprises:
determining whether each beam included in the beam level is available, wherein an availability of a beam included in the beam level is based at least in part on an operating condition of the UE.

13. The method of claim 1, wherein transmitting, to the network entity, the measurement report indicating the modified channel condition value comprises:
determining that a modified channel condition value of the beam satisfies a reporting threshold for reporting channel condition values of the second RAT; and
transmitting, to the network entity, the measurement report indicating the modified channel condition value of the beam based at least in part on the determination that the modified channel condition value of the beam satisfies the reporting threshold for reporting the channel condition values of the second RAT.

14. A user equipment (UE) for wireless communication, comprising:
a memory; and
one or more processors coupled to the memory, the one or more processors configured to:
establish a first communication connection using a first radio access technology (RAT);
measure a beam of a second RAT, according to a measurement configuration received via the first communication connection, to determine a channel condition value of the beam;
modify the channel condition value based at least in part on at least one of one or more beam characterizations, a derivation of a beamforming gain value, or an estimation of the beamforming gain value; and
transmit, to a network entity, a measurement report indicating the modified channel condition value.

15. The UE of claim 14, wherein the one or more processors are further configured to:
determine a modification trigger event based at least in part on the measurement of the beam,
wherein modifying the channel condition value is based at least in part on the determination of the modification trigger event.

16. The UE of claim 14, wherein the measurement configuration is associated with an inter-RAT (IRAT) cell selection procedure, and
wherein the measurement configuration indicates a measurement event for reporting measurement values for the IRAT cell selection procedure.

17. The UE of claim 14, wherein the one or more processors, when measuring the beam, are configured to:
measure the beam using a wide beam to determine the channel condition value of the beam.

18. The UE of claim 14, wherein the one or more processors are further configured to:
determine the beamforming gain value associated with the measurement of the beam, wherein the beamforming gain value is based at least in part on at least one of:
an antenna module associated with a wide beam used to determine the channel condition value of the beam,
the wide beam used to determine the channel condition value of the beam, or
an available beam level of the antenna module associated with the wide beam used to determine the channel condition value of the beam.

19. The UE of claim 14, wherein the one or more processors are further configured to:
determine the beamforming gain value based at least in part on at least one of:
the one or more beam characterizations,
the derivation of the beamforming gain value, or
the estimation of the beamforming gain value.

20. The UE of claim 14, wherein the one or more processors are further configured to:
determine a modification trigger event based on at least one of:
a difference between the channel condition value of the beam and a reporting threshold for reporting channel condition values of the second RAT satisfies a threshold, or
the channel condition value of the beam of the RAT satisfies a cell edge threshold.

21. The UE of claim 14, wherein the one or more processors, when modifying the channel condition value, are configured to:
modify the channel condition value of the beam by the beamforming gain value.

22. The UE of claim 21, wherein the one or more processors, when modifying the channel condition value of the beam by the beamforming gain value, are to:
determine a beam level, of one or more beam levels associated with an antenna module of the UE, with all beams included in the beam level available; and
modify the channel condition value of the beam by a beamforming gain value associated with the beam level with all beams included in the beam level available.

23. The UE of claim 22, wherein the one or more processors, when determining the beam level with all beams included in the beam level available, are to:
determine whether each beam included in the beam level is available, wherein an availability of a beam included in the beam level is based at least in part on an operating condition of the UE.

24. The UE of claim 14, wherein the one or more processors, when transmitting, to the network entity, the measurement report indicating the modified channel condition value, are configured to:
determine that a modified channel condition value of the beam satisfies a reporting threshold for reporting channel condition values of the second RAT; and transmit, to the network entity, the measurement report indicating the modified channel condition value of the beam based at least in part on the determination that the modified channel condition value of the beam satisfies the reporting threshold for reporting the channel condition values of the second RAT.

25. The UE of claim 14, wherein the first RAT is a Long Term Evolution (LTE) RAT and the second RAT is a New Radio (NR) RAT.

26. A non-transitory computer-readable medium storing a set of instructions for wireless communication, the set of instructions comprising:
one or more instructions that, when executed by one or more processors of a user equipment (UE), cause the UE to:
establish a first communication connection using a first radio access technology (RAT);
measure a beam of a second RAT, according to a measurement configuration received via the first communication connection, to determine a channel condition value of the beam;
modify the channel condition value based at least in part on at least one of one or more beam characterizations, a derivation of a beamforming gain value, or an estimation of the beamforming gain value; and
transmit, to a network entity, a measurement report indicating the modified channel condition value.

27. The non-transitory computer-readable medium of claim 26, wherein the one or more instructions, when executed by the one or more processors, further cause the UE to:
determine a modification trigger event based at least in part on the measurement of the beam,
wherein modifying the channel condition value is based at least in part on the determination of the modification trigger event.

28. The non-transitory computer-readable medium of claim 26, wherein the measurement configuration is associated with an inter-RAT (IRAT) cell selection procedure, and
wherein the measurement configuration indicates a measurement event for reporting measurement values for the IRAT cell selection procedure.

29. An apparatus for wireless communication, comprising:
means for establishing a first communication connection using a first radio access technology (RAT);
means for measuring a beam of a second RAT, according to a measurement configuration received via the first communication connection, to determine a channel condition value of the beam;
means for modifying the channel condition value based at least in part on at least one of one or more beam characterizations, a derivation of a beamforming gain value, or an estimation of the beamforming gain value; and
means for transmitting, to a network entity, a measurement report indicating the modified channel condition value.

30. The apparatus of claim 29, further comprising:
means for determining a modification trigger event based at least in part on the measurement of the beam,
wherein modifying the channel condition value is based at least in part on the determination of the modification trigger event.

* * * * *